(12) United States Patent
Morita

(10) Patent No.: US 8,144,234 B2
(45) Date of Patent: Mar. 27, 2012

(54) IMAGE DISPLAY APPARATUS, IMAGE CAPTURING APPARATUS, AND IMAGE DISPLAY METHOD

(75) Inventor: Masahiko Morita, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 11/854,682

(22) Filed: Sep. 13, 2007

(65) Prior Publication Data

US 2008/0068487 A1   Mar. 20, 2008

(30) Foreign Application Priority Data

Sep. 14, 2006   (JP) ................. 2006-249958

(51) Int. Cl.
*G03B 13/00* (2006.01)
*H04N 7/18* (2006.01)

(52) U.S. Cl. .................. 348/345; 348/63
(58) Field of Classification Search ............ 348/333.05, 348/345, 333.01–333.03, 63, 33.05
See application file for complete search history.

(56) References Cited

U.S. PATENT DOCUMENTS

| | | | | |
|---|---|---|---|---|
| 7,230,648 | B2 * | 6/2007 | Ueno | 348/340 |
| 7,298,412 | B2 * | 11/2007 | Sannoh et al. | 348/348 |
| 7,376,347 | B2 * | 5/2008 | Sugimoto | 396/60 |
| 7,453,506 | B2 * | 11/2008 | Li | 348/333.12 |
| 2003/0071908 | A1 * | 4/2003 | Sannoh et al. | 348/345 |
| 2005/0046730 | A1 * | 3/2005 | Li | 348/333.12 |
| 2005/0251015 | A1 | 11/2005 | Takikawa | |
| 2006/0104487 | A1 * | 5/2006 | Porter et al. | 382/118 |
| 2007/0030381 | A1 | 2/2007 | Maeda | |
| 2009/0079860 | A1 | 3/2009 | Li | |

FOREIGN PATENT DOCUMENTS

| | | |
|---|---|---|
| CN | 1691740 A | 11/2005 |
| JP | 2003-107335 A | 4/2003 |
| JP | 2003-107555 A | 4/2003 |
| JP | 2003-0153045 A | 5/2003 |
| JP | 2003-153045 A | 5/2003 |
| JP | 2003-179798 A | 6/2003 |
| JP | 2004-064259 A | 2/2004 |
| JP | 2005-091432 A | 4/2005 |
| JP | 2005-102175 A | 4/2005 |
| JP | 2006-201282 A | 8/2006 |

* cited by examiner

*Primary Examiner* — David Ometz
*Assistant Examiner* — Ahmed A Berhan
(74) *Attorney, Agent, or Firm* — Canon USA Inc. IP Division

(57) ABSTRACT

An apparatus includes an obtaining unit that obtains a captured image containing face detection information related to a face of an object detected during image capture, and information related to a focus detection area utilized during the image capture, an extraction unit that extracts an area based on the information related to the focus detection area and the face detection information from the captured image when the focus detection area is determined based on the detected object's face, and extracts an area based on the information related to the focus detection area from the captured image when the focus detection area is not determined based on the detected object's face, and a display unit that displays a partial area of the captured image on a display device, wherein the display unit displays an image of the extracted area on the display device.

9 Claims, 19 Drawing Sheets

IMAGE DISPLAY APPARATUS, IMAGE CAPTURING APPARATUS, AND IMAGE DISPLAY METHOD

BACKGROUND OF THE INVENTION

1. Field of the Invention

The present invention generally relates to an image display apparatus, an image capturing apparatus, and an image display method. More particularly, the present invention relates to technology for displaying, on an image display apparatus, images associated with in-focus areas used for focusing during image capture.

2. Description of the Related Art

By displaying images captured with a digital camera, etc. (hereinafter referred to as "captured images") on the display of the digital camera or on the display of a PC (personal computer), etc., the user can verify the focus state during image capture. However, since the focus detection areas used for focusing during image capture are in general extremely small, when the entire captured image is displayed on the display, it is not easy for the user to verify whether the image is correctly focused in the focus detection areas.

Accordingly, technologies have been proposed for facilitating focus state verification by the user by displaying on a display enlarged focus detection area images after image capture and during image capture (see Japanese Patent Laid-Open No. 2004-64259 and Japanese Patent Laid-Open No. 2003-153045).

In addition, as can be seen from Japanese Patent Laid-Open No. 2004-64259 and Japanese Patent Laid-Open No. 2003-153045, in conventional image capturing apparatuses, one or more focus detection areas were preset in the imaging region. However, when a person is the object, it is necessary to be able to appropriately focus on the person no matter where the person is located in the imaging region. Accordingly, technologies have been proposed for detecting the faces of people being photographed (hereinafter referred to simply as "faces") in the imaging region and setting up focus detection areas in the vicinity of the detected faces (see Japanese Patent Laid-Open No. 2003-107335 and Japanese Patent Laid-Open No. 2003-107555).

Conventional technology did not consider whether the focus detection areas were set based on faces when images used for focus state verification were displayed on the display. However, images suitable for focus state verification vary depending on whether the focus detection areas are face-based or not.

The present invention was made with account taken of such circumstances and provides a technology for displaying, on an image display apparatus, enlarged images suitable for verifying the focus state of captured images regardless of whether the focus detection areas are face-based or not.

SUMMARY OF THE INVENTION

According to an aspect of the present invention, there is provided an image display apparatus including an obtaining unit that obtains a captured image containing face detection information, which is information related to a face of an object detected during image capture, and information related to a focus detection area utilized during the image capture, an extraction unit that extracts an area based on the information related to the focus detection area and the face detection information from the captured image when the focus detection area is determined based on the detected object's face, and extracts an area based on the information related to the focus detection area from the captured image when the focus detection area is not determined based on the detected object's face, and a display unit that displays a partial area of the captured image on a display device, wherein the display unit displays an image of the extracted area on the display device.

According to another aspect of the present invention, there is provided an image display apparatus including an obtaining unit that obtains a captured image captured upon undergoing focusing control based on an output signal from a focus detection area determined based on face detection information, which is information related to a face of an object, and a display unit that displays a partial area of the captured image on a display device, wherein the display unit displays an area having a first ratio relative to the captured image on the display device when the focus detection area is determined in accordance with a position of the detected object's face, and displays an area having a second ratio, independent of the first ratio, relative to the captured image on the display device when the focus detection area is not determined in accordance with the position of the detected object's face.

According to yet another aspect of the present invention, there is provided an image display apparatus including an obtaining unit that obtains a captured image captured upon undergoing focusing control based on an output signal from a focus detection area determined based on face detection information, which is information related to a face of an object, a display unit that displays a partial area of the captured image on a display device, wherein the display unit extracts a face area from the captured image based on the face detection information and displays the face area on the display device, and a change unit that changes a range of extraction, performed by the display unit, relative to the captured image, wherein the change unit stores the range of extraction obtained after the change, and when extracting and displaying a face area from a next captured image, the display unit extracts the face area from the next captured image in accordance with the stored range of extraction and displays the face area on the display device.

Further features of the present invention will become apparent from the following description of exemplary embodiments with reference to the attached drawings.

DESCRIPTION OF THE EMBODIMENTS

Exemplary embodiments of the present invention will now be described with reference to the attached drawings.

<Configuration of Digital Camera 100>

A description will be now given of an embodiment in which the image display apparatus of the present invention is applied to a digital camera 100.

Figure 1:
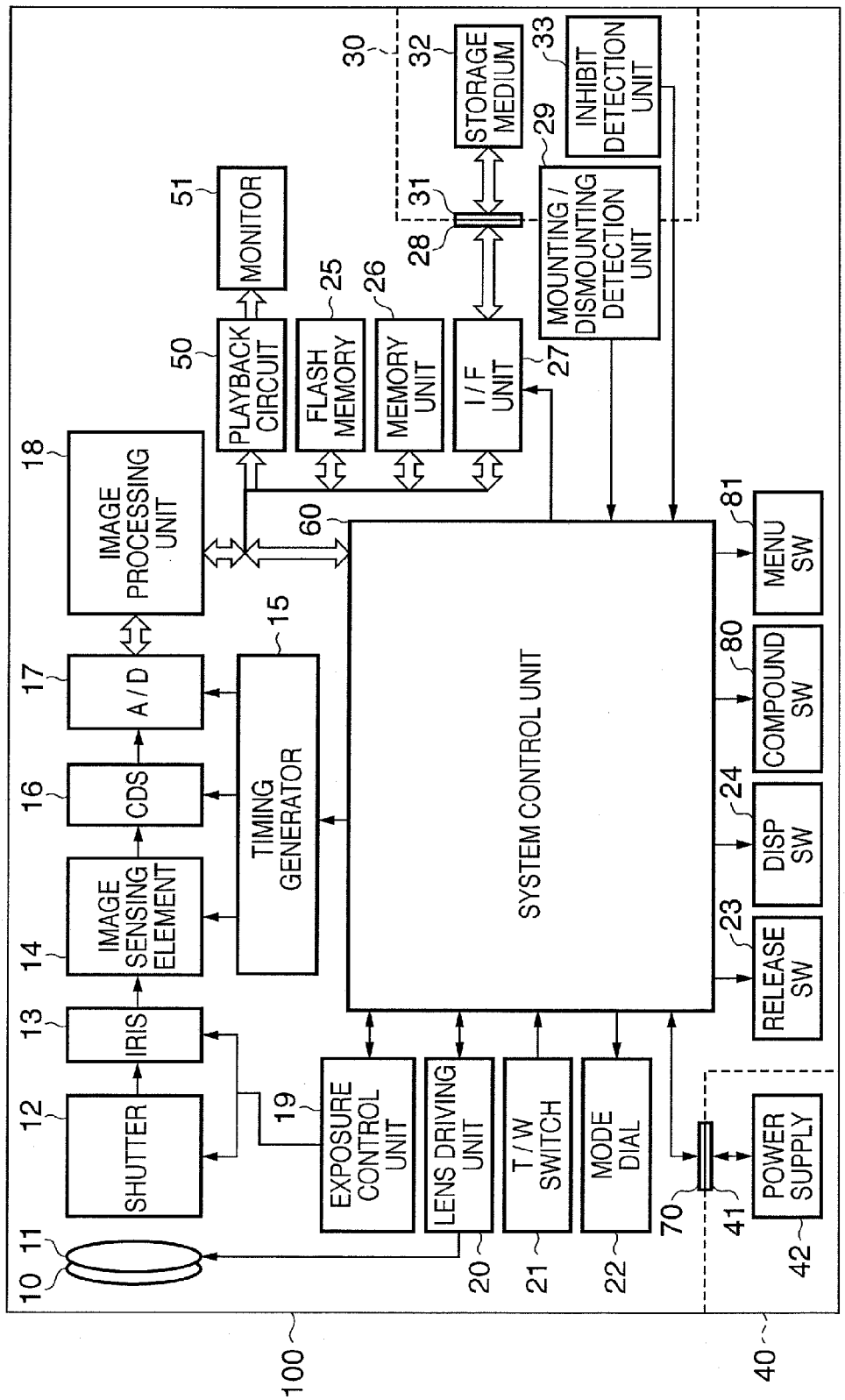
FIG. 1 is a block diagram illustrating the configuration of a digital camera according to an embodiment.

FIG. 1 is a block diagram illustrating the configuration of the digital camera 100 used in the present embodiment. For description purposes, the present embodiment is described using a CCD as the image sensing element. However, any image sensing element, such as a CMOS sensor, that would enable practice of the present invention may be used.

The digital camera 100 includes a variator lens 10, a focusing control lens 11, a mechanical shutter that blocks incident light 12, an iris 13 that adjusts the amount of incident light 13, and an image sensing element 14. In addition, timing generator 15 drives the image sensing element 14 and generates a timing pulse necessary for sampling. Moreover, CDS element 16 subjects the output of the image sensing element 14 to double-correlated sampling based on the timing pulse of the timing generator 15. A/D converter 17 converts the analog signal obtained as output from the CDS element 16 into a digital signal.

Image processing unit 18 includes a signal processing circuit, a face detection circuit, a reducing circuit, a raster block conversion circuit, and a compression circuit (actual circuits not shown), which are used for performing various image processing operations upon the digital signal output as image data by the A/D converter 17.

Along with generating a luminance signal by performing color carrier removal, aperture correction, and gamma correction processing, etc. on the digital signal output by the A/D converter 17, the signal processing circuit generates color-difference signals by performing color interpolation, matrix transforms, gamma processing, gain adjustment, etc. YUV-formatted image data is then formed in the memory unit 26.

The reducing circuit subjects the image data output by the signal processing circuit to image data extraction, thinning, and linear interpolation to reduce the image both in the horizontal and vertical directions and generate raster scan image data. This is done to satisfy user requests when the user wants to store images smaller than the acquired image on a storage medium 32. Accordingly, if the user does not want to reduce the image, the reducing circuit does not perform image reduction.

The raster block conversion circuit converts the raster-scan image data obtained via reduction in the reducing circuit into block-scan image data.

The compression circuit compresses, on a block unit basis, the image data converted into block-scan image data in the raster block conversion circuit into JPEG data.

The face detection circuit uses the YUV-formatted image data output by the signal processing circuit to detect faces present in the imaging region. The face detection circuit and face detection processing based thereon are described below with reference to FIG. 2.

The above-described series of image processing operations uses the memory unit 26 as a buffer memory.

System control unit 60, which includes a CPU, a DMAC (Direct Memory Access Controller), a bus arbiter, etc., controls operation of the above-described processing operations. The programs executed by the CPU are stored in a flash memory 25.

Exposure control unit 19 controls the mechanical shutter 12 and iris 13, while lens driving unit 20 moves the variator lens 10 and focusing control lens 11 along an optical axis to image the field image onto the image sensing element 14.

T/W switch 21 allows the user to configure viewing angles, while mode dial 22 is used by a user to configure the operating mode of the digital camera 100. The viewing angle configuration carried out by actuation of the T/W switch 21 includes optical zooming, which is based on moving the variator lens 10, and electronic zooming, which is based on driving the image sensing element 14 and subjecting the output of the image sensing element 14 to image processing, with the T/W switch 21 used for both types of zooming. In addition, the T/W switch 21 can be used for varying the magnification ratio of the hereinafter described near-focused position.

Release switch 23 is utilized by a user to issue image (still image) capture commands, while DISP switch 24 is used for switching the display of images on a monitor 51 ON/OFF, etc. The release switch 23 is a double-action switch with two positions. When depressed toward the first position (depressed half way), the digital camera 100 prepares for image capture, and when depressed towards the second position (fully depressed), the digital camera 100 carries out image capture.

The digital camera 100 includes a power supply 42, including a battery etc., where connectors 41, 70 are used to connect the digital camera 100 and the power supply 42. Power supply box 40 holds the power supply 42. A storage unit 30 holds storage medium 32 and the inhibit detection unit 33. The storage medium 33 stores images. Connectors 28 and 31 connect the digital camera 100 and the storage medium 32. Inhibit detection unit 33 detects the state of the write inhibit switch of the storage medium 32, and mounting/dismounting detection unit 29 detects the mounting/dismounting of the storage medium 32. An interface unit 27 is an interface for communication between the storage medium 32 and components of the digital camera 100.

Compound switch 80 combines the functions of a decision switch and an up/down and longitudinal/vertical switch used for cursor movement, etc., which is displayed simultaneously with an EVF (electronic viewfinder) display and menu screen displayed on the monitor 51. The compound switch 80 is also used to configure the viewing angle of images displayed on the monitor 51 during still image capture and for configuring the viewing angle of images captured and recorded as still images. Menu switch 81 displays a menu screen used for various settings in each mode on the monitor 51, and is also used when switching the in-focus position during the hereinafter explained enlarged display of the in-focus position.

Playback circuit 50 converts the image data generated by the image processing unit 18 and stored in the memory unit 26 into images intended for viewing, and transfers them to the monitor 51. The playback circuit 50 separates the YUV-formatted image data into a luminance component signal Y and modulated color difference component C and passes the Y signal, which is converted into an analog signal via D/A conversion, through a LPF (low-pass filter). Moreover, an analog C signal, which is obtained by D/A conversion, is passed through a BPF (band-pass filter) to extract only the frequency component of the modulated color difference component. Based on the thus generated signal component and sub-carrier frequency, the playback circuit 50 converts the Y signal and C signal into an RGB signal and outputs it to the monitor 51. The successive processing and display of the image data obtained from the image sensing element on the monitor 51 in this manner makes it possible to implement EVF functionality.

<Face Detection Circuit and Face Detection Processing>

Figure 2:
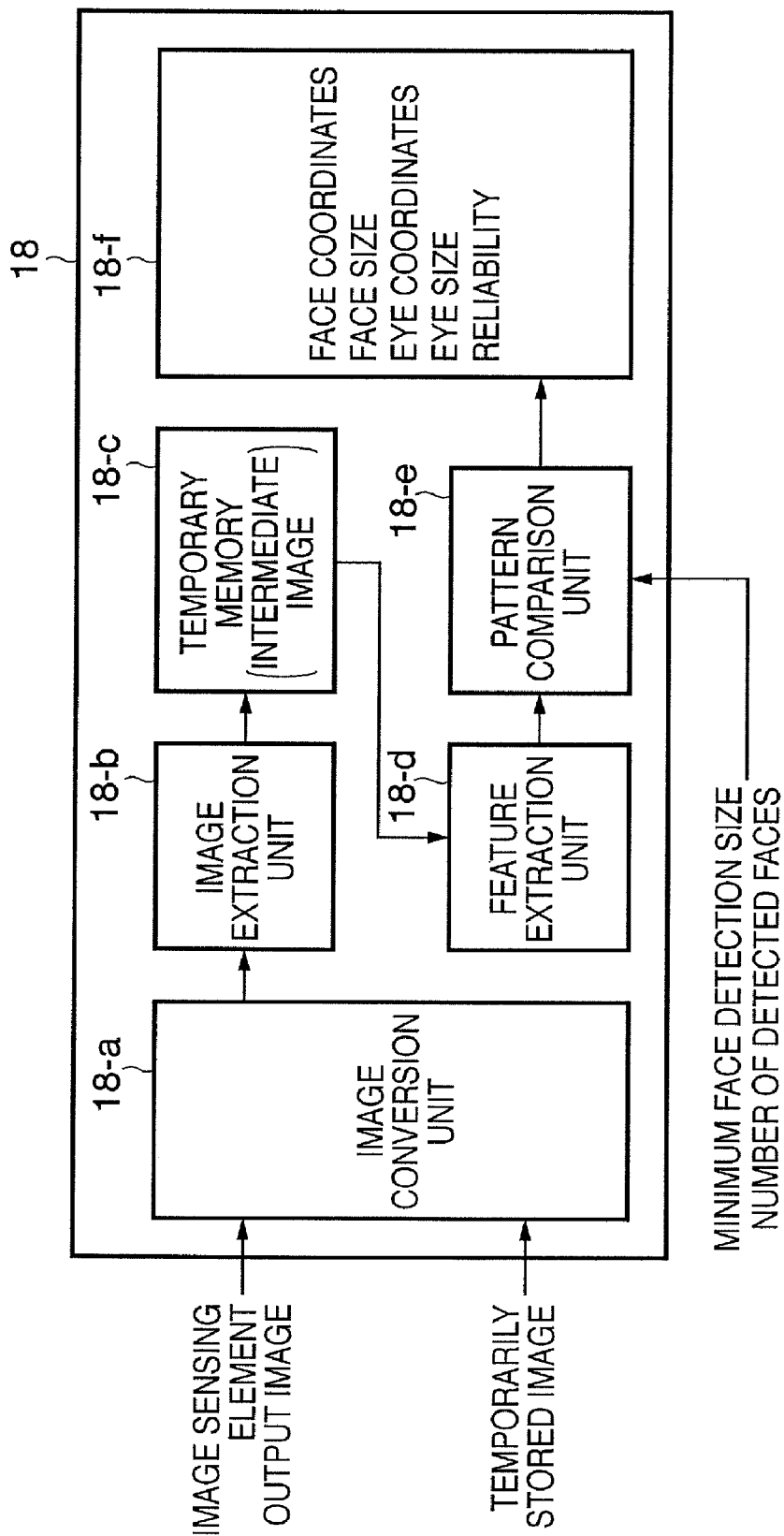
FIG. 2 is a block diagram illustrating a configuration of a face detection circuit comprised in an image processing unit of the digital camera.

FIG. 2 is a block diagram illustrating the configuration of the face detection circuit, which is located in the image processing unit 18, used for detecting the faces of people as an object.

The face detection circuit can select image data in the YUV format output by the signal processing circuit, or image data in the YUV format that is JPEG-expanded and buffered in the memory unit 26. The input YUV-formatted image data is converted into an image of a predetermined size in an image conversion unit, 18-*a*. The "predetermined size" mentioned here affects the accuracy of face detection and processing speed during the subsequently performed pattern comparison. Although this is a QVGA size (320×240) the present embodiment is not limited to this particular size.

Next, the desired area is cut out in an image extraction unit, 18-*b*, producing an intermediate image. The "desired area" mentioned here determines the area subject to face detection in the input images. While in this case the desired area corresponds to 80% of the central viewing angle of the screen, assuming that the person who is the main object is not on the periphery of the object field, the area is not limited thereto. The intermediate image is temporarily stored in a temporary memory 18-*c*. The memory unit 26 may also be used for temporarily storing the intermediate image.

Next, luminance extraction and filtering are carried out in a feature extraction unit, 18-*d*. Upon pattern comparison, in the pattern comparison unit 18-*e*, using the results, face coordinates, face size, eye coordinates, eye size, and face reliability are output in 18-*f* as face detection information, which is information related to the faces of the objects. It should be noted that when pattern comparison is carried out during face detection, it is possible to configure the maximum number of detected faces and pixel sizes recognized as faces.

Here, when multiple faces are detected in the imaging region, multiple pieces of face detection information are output from the face detection circuit. On the other hand, when no faces are detected in the imaging region, the face detection information that indicates that no faces have been detected, for instance, the face detection information has 0 as the face size, is output.

<External Appearance of Digital Camera 100>

Figure 3:
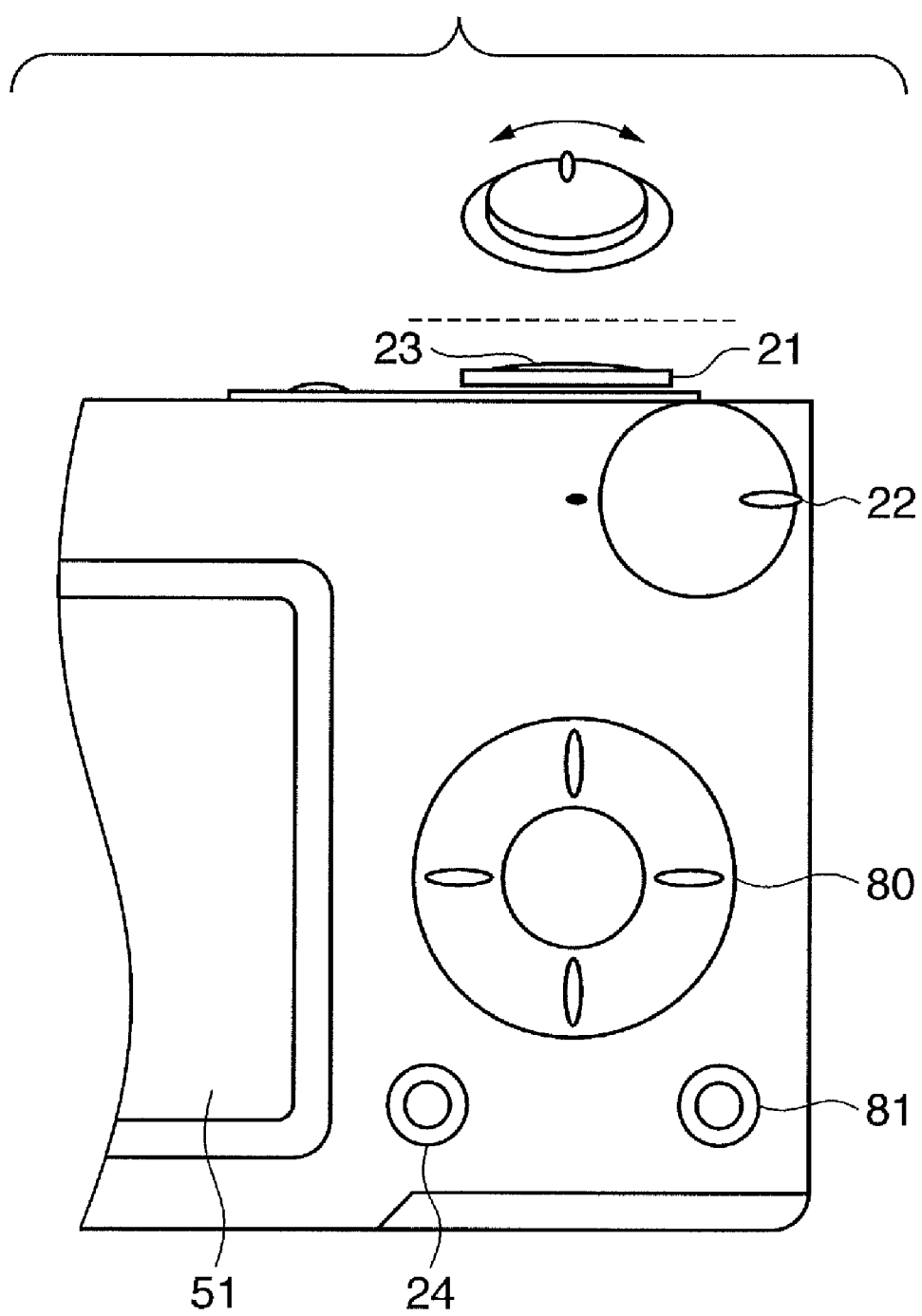
FIG. 3 is a partial illustration of the external appearance of the digital camera.

FIG. 3 is a partial illustration of the external appearance of the digital camera 100. As illustrated in FIG. 3, T/W switch 21, mode dial 22, release switch 23, DISP switch 24, monitor 51, menu switch 81, and compound switch 80 are visible on the exterior of the digital camera 100.

By actuating the protrusion in the center of the T/W switch 21 in the direction indicated by the arrows, a user can cause the variator lens 10 to move towards the Tele (telescopic) side or towards the Wide (wide angle) side. The actuating ring of the T/W switch 21 is connected to a built-in variable resistor (not shown) and voltage values uniquely determined by actuation of the switch are input to the A/D converter of the system control unit 60, wherein the input voltage values are converted to digital signals.

The CPU and programs in the system control unit 60 can control the speed of movement of the variator lens 10 in response to the actuation of the T/W switch 21. For instance, in a 10-bit A/D converter, with the center at 511 LSB, ±255 would be a low-speed range, and ±256 or higher would be a high-speed range. Speed division is not limited to the two-range division.

The unit pixels of the image sensing element 14 have RGB hue filters forming a Bayer array. When capturing a still image, etc., image generation is performed by reading practically all the pixels in the effective area. In the case of a CCD, as the front curtain, the charge of the photodiodes (hereinafter referred to as "PD") is swept away. Subsequently, the optical path is blocked by closing a shutter constituted by a mechanical shielding member, as the rear curtain, whereupon the charge for one surface stored in the PDs is moved to the vertical transfer register of the CCD and read out one line at a time.

In the case of a CMOS, the charge of the floating diffusion (referred to as FD below), which is a storage area for temporary storage of the charge generated by the PDs, is reset collectively along with the PDs of each pixel to perform a collective reset readout, with the readout carried out on a line-by-line basis. At such time, a shutter constituted by a mechanical shielding member is also used as the rear curtain. The resultant image data is stored once in the memory unit 26, and the above-described signal processing is carried out by the image processing unit 18.

On the other hand, EVF display and video capture are, because of the nature thereof, implemented by subjecting the image data read and output by the image sensing element 14 to successive image processing operations by performing averaging and thinning so that the number of pixels is in the vicinity of the number of pixels required for generating images intended for display. In the case of a CMOS, this is done by scanning that involves continuously reading out the charges while maintaining a constant storage time on a line unit basis by resetting the charge accumulated in the PD and FD on a pixel unit or line unit basis and then performing readout on a pixel unit or line unit basis. Moreover, in the case of a CCD, this is done by sweeping the charges of the PDs on a surface unit basis, moving to the vertical transfer path and performing readout on a surface unit basis.

<Flow of Image Capture Processing>

Figure 4:
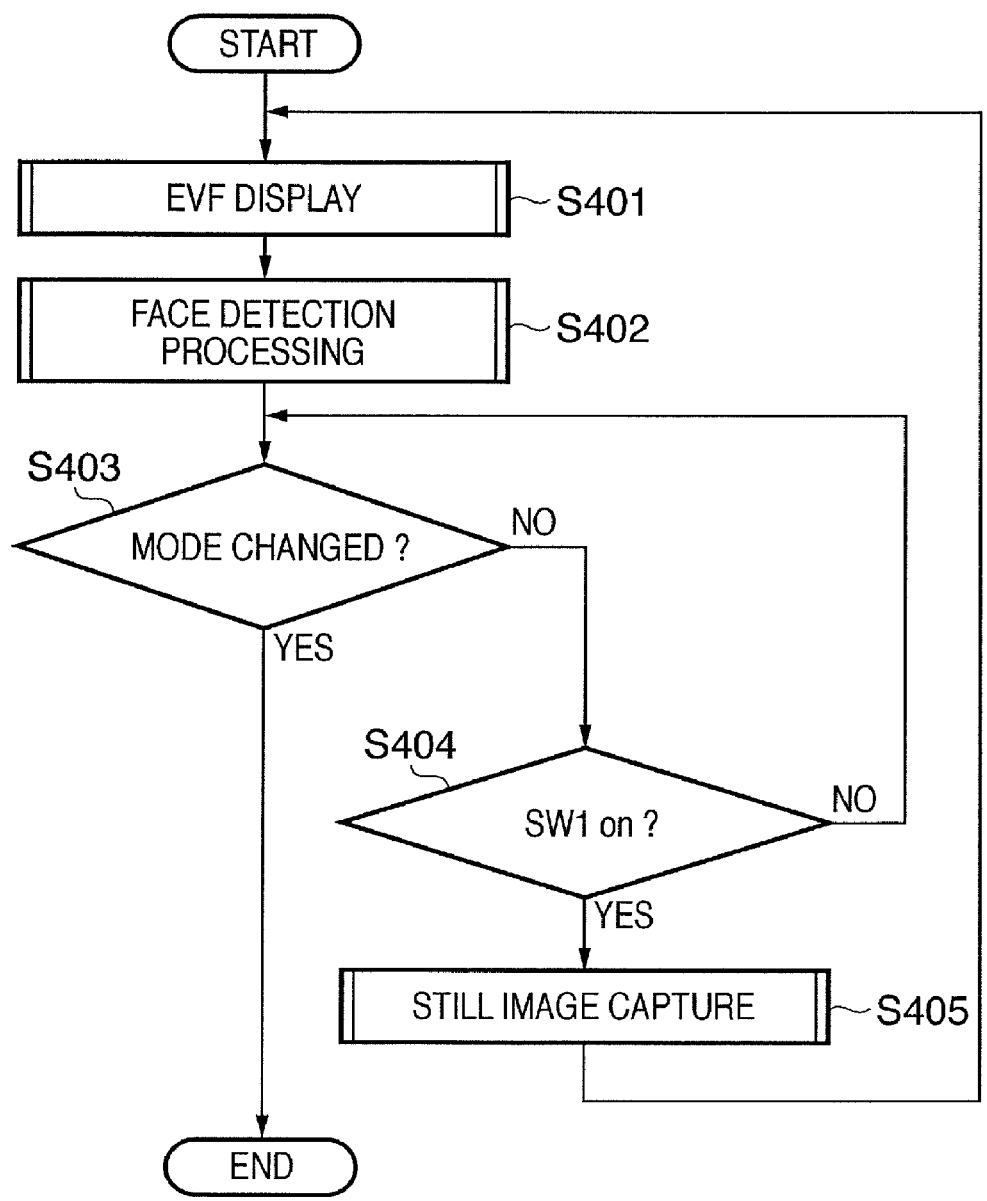
FIG. 4 is a flow chart illustrating the flow of image capture processing using the digital camera.

FIG. 4 is a flow chart illustrating the flow of image capture processing using the digital camera 100. The steps depicted in FIG. 4, as well as the steps of the flow charts described below, are usually implemented by execution of programs stored in the flash memory 25 by the system control unit 60. However, any other method of implementing the processes illustrated in the flowcharts that would enable practice of the present invention is applicable.

First, when the mode dial 22 is set to the capture mode, the digital camera 100 enters the capture mode and, in Step S401, initiates an EVF display on the monitor 51. The EVF display continues until it is terminated in Step S509 of FIG. 5 described below.

In Step S402 the digital camera 100 initiates face detection processing in the display area. As a result of the face detection processing, face detection information is acquired in accordance with the number of faces detected in the imaging region and is stored in the memory unit 26. The face detection processing is carried out in an appropriately timed fashion and the face detection information stored in the memory unit 26 is updated until the processing of step S501 of FIG. 5, as described below, is carried out.

In Step S403, the digital camera 100 determines whether the mode dial 22 has been actuated. If the mode dial 22 has been actuated, the processing of this flow chart terminates and the digital camera 100 performs the processing that corresponds to the mode configured as a result of actuation. If the mode dial 22 has not been actuated, control proceeds to Step S404.

In Step S404, the digital camera 100 determines whether the release switch 23 has been depressed halfway or not. If it has been depressed halfway, control proceeds to Step S405, and if not, it returns to Step S401.

In Step S405, the digital camera 100 captures a still image and control returns to Step S401. The image capture processing of an image is described below with reference to FIG. 5.

Figure 5:
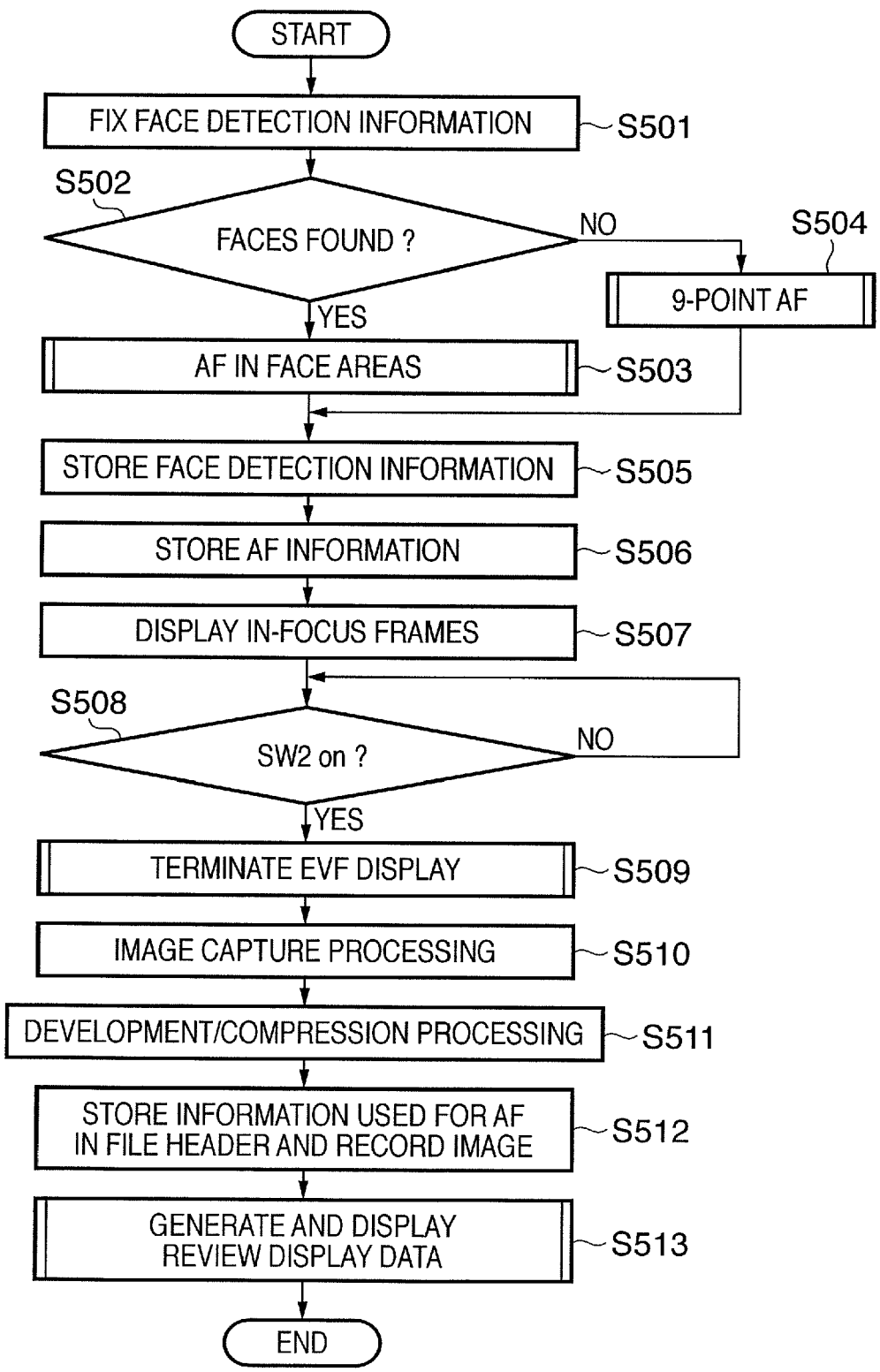
FIG. 5 is a flow chart illustrating the detailed flow of image capture processing of an image in Step S405 of FIG. 4.

FIG. 5 is a flow chart illustrating the flow of image capture processing of an image in Step S405 of FIG. 4.

In Step S501 the digital camera 100 terminates the face detection processing and confirms the face detection information (e.g., face coordinates, face size, eye coordinates, eye size, and face reliability) stored in the memory unit 26 at this point in time as the final face detection information. It should be noted that when no faces are detected, as described above, the information stored in the memory unit 26 indicates that no faces have been detected. For instance, the face detection information has 0 as the face size, etc.

In Step S502, the digital camera 100 refers to the face detection information and determines whether faces have been detected in the imaging region. If faces have been detected, control proceeds to Step S503, and if no faces have been detected, control proceeds to Step S504.

In Step S503 the digital camera 100 configures focus detection areas in the imaging region based on the position of the detected faces, as described below with respect to FIGS. 6A to 6C. The digital camera 100 then performs focus detection in the configured focus detection areas by moving the focusing control lens 11. Next, the focusing control lens 11 is moved to a position, wherein it focuses on the focus detection area corresponding to the face having the highest priority. At the same time, based on the focus detection results, the digital camera 100 determines the focus detection areas (in-focus areas) corresponding to faces present at the same depth of field as the face having the highest priority. Here, priority is determined based on the face detection information such that, for instance, the larger the size of the face and the closer it is to the center of the imaging region, the higher its priority will be. In addition, there is no need to set focus detection areas for all the detected faces and, for instance, it may be possible to set focus detection areas based only on the positions of three faces with top priority.

In Step S504 the digital camera 100 moves the focusing control lens 11 to perform focus detection in nine focus detection areas preconfigured in the imaging region. Next, the focusing control lens 11 is moved to a position, wherein it focuses on a focus detection area selected based on predetermined conditions. At the same time, using the focus detection results, the digital camera 100 determines the focus detection areas (in-focus areas) where objects are present at the same depth of field as the object of the focus detection area selected based on the predetermined conditions.

In Step S505 the digital camera 100 stores face detection information concerning the faces corresponding to the in-focus areas, if Step S503 has been executed, or face detection information indicating that no faces have been detected, if Step S504 has been executed, in the memory unit 26.

In Step S506 the digital camera 100 stores the coordinates, sizes, and evaluation scores, which are referred to as "in-focus information" below, of the focus detection areas obtained as in-focus areas in Step S503 or Step S504 in the memory unit 26. The term "evaluation scores", as used herein, refers to contrast values obtained by contrast computation carried out during focus detection.

In Step S507 the digital camera 100 displays rectangular frames (in-focus frames) indicating in-focus areas on the monitor 51.

The relationship between the focus detection areas and in-focus areas in Step S503 through Step S507 is explained below with reference to FIGS. 6A to 6C, FIGS. 7A and 7B, and FIGS. 8A and 8B.

In Step S508 the digital camera 100 waits for the release switch 23 to be fully depressed.

In Step S509 the digital camera 100 terminates the EVF display.

In Step S510 the digital camera 100 carries out image capture processing and the image processing unit 18 acquires image data in digital signal form from the A/D converter 17.

In Step S511 the digital camera 100 uses the image processing unit 18 to carry out compression processing etc. on the image data, thereby obtaining JPEG image data.

In Step S512 the digital camera 100 records the face detection information stored in Step S505 and in-focus information stored in Step S506 in the header of the JPEG image data obtained in Step S511 and stores it on the storage medium 32.

In Step S513 the digital camera 100 generates and displays data, hereinafter referred to as "review display data", used to display the JPEG image data stored in Step S512 on the monitor 51. The process of generation/display of the review display data is described below with reference to FIG. 10.

The processing of step S513 may also be executed in a similar way in Step S507. This makes it easier for the user to verify the focus state prior to image capture.

<Focus Detection Areas and In-focus Areas>

FIGS. 6A to 6C, FIGS. 7A and 7B, and FIGS. 8A and 8B are diagrams illustrating the relationship between the focus detection areas and in-focus areas in Steps S503 through S507 of FIG. 5.

Explanations will now be given with reference to FIGS. 6A to 6C regarding a case in which the imaging region includes a single face. In FIG. 6A, the rectangular solid-line frame is a face detection frame, or a frame indicating an area where a face was detected in Step S402 of FIG. 4. Additionally, the dotted-line rectangular frame is a focus detection frame, or a frame indicating a focus detection area. The face detection frame and focus detection frame are not displayed on the monitor 51. FIG. 6B is an enlarged view of the vicinity of the face illustrated in FIG. 6A. The face detection frame contains the coordinates of the face detected by the face detection circuit and its size is sufficient to include at least the eyes, nose, and mouth. When the camera is focused on the focus detection frame illustrated in FIGS. 6A and 6B, the focus detection area indicated by this focus detection frame becomes an in-focus area. An in-focus frame is then displayed on the monitor 51, as illustrated in FIG. 6C. The displayed in-focus frame is typically larger than the in-focus area, so as to avoid overlapping with the face. Accordingly, the in-focus frame does not necessarily coincide with the in-focus area.

Figure 7A:
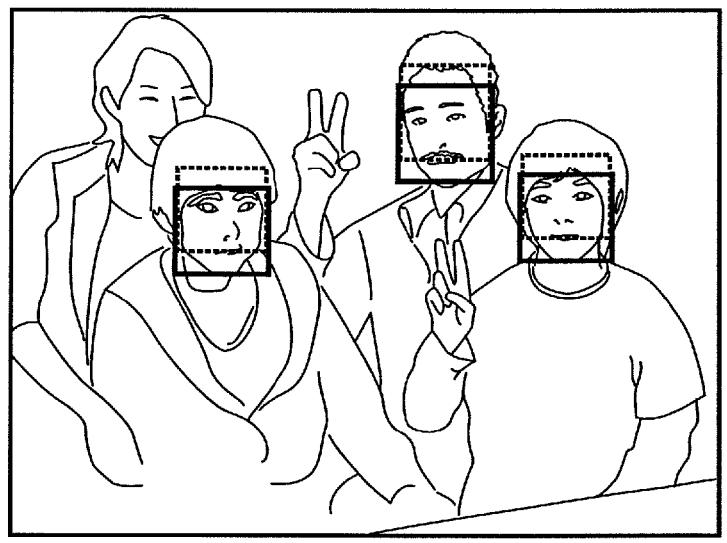
FIGS. 7A and 7B are diagrams illustrating the relationship between the focus detection areas and in-focus areas in Steps S503 through S507 of FIG. 5.
Figure 7B:
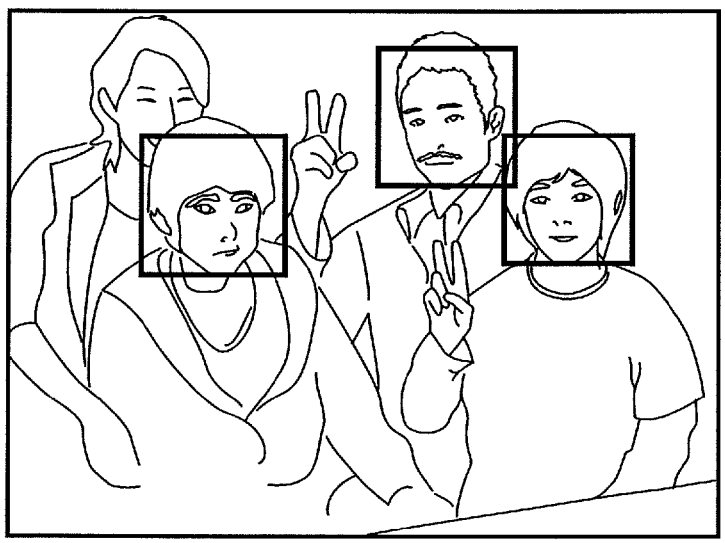

FIGS. 7A and 7B illustrate a case in which the imaging region contains multiple faces, e.g., four faces. Focus detection areas are configured for the three top-priority faces as described above (see FIG. 7A). Moreover, when, as a result of focus detection in the configured focus detection areas, the digital camera 100 focuses on all three focus detection areas, and the respective focus detection areas become in-focus areas. In-focus frames are then displayed in the in-focus areas corresponding to the three faces, as illustrated in FIG. 7B.

Figure 8A:
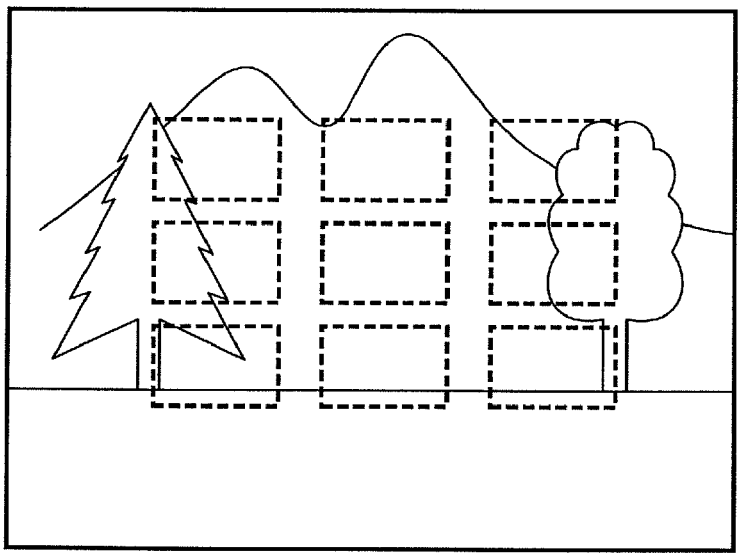
FIGS. 8A and 8B are diagrams illustrating the relationship between the focus detection areas and in-focus areas in Steps S503 through S507 of FIG. 5.
Figure 8B:
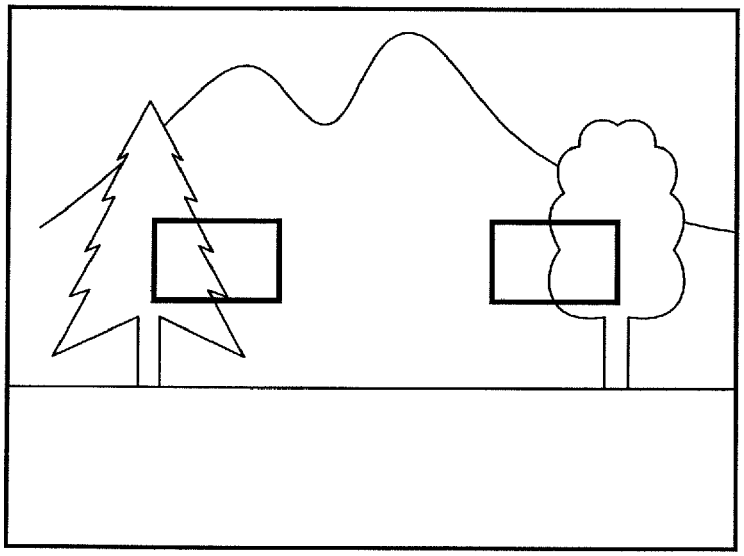

FIGS. 8A and 8B illustrate a case in which no faces are contained or a case in which no faces have been detected, even though faces are present, in the imaging region. In this case, there are nine preset focus detection areas, as illustrated by the dotted-line frames in FIG. 8A. The dotted-line frames of FIG. 8A are not displayed on the monitor 51. In-focus frames, such as those illustrated in FIG. 8B, are displayed on the monitor 51 in the focus detection areas (in-focus areas) focused as a result of focus detection. Unlike the case where faces are detected, here, the in-focus frames and in-focus areas coincide.

<Outline of Review Display>

Several different kinds of review displays used for displaying captured images on the monitor 51 are available and can be switched in accordance with user instructions. The DISP switch 24 is used for review type switching. In several review types, images associated with the in-focus areas are displayed on an enlarged scale. For instance, when there are multiple in-focus areas, an image associated with the in-focus area possessing the highest evaluation score is displayed on an enlarged scale. Alternatively, when the in-focus areas are face-based, an image associated with the in-focus area corresponding to the face having the highest reliability may be displayed on an enlarged scale. Also, depending on user instructions, the in-focus areas corresponding to the displayed enlarged images are switched in the order of evaluation scores (or reliability, etc.). The menu switch 81 is used for in-focus area switching.

FIGS. 9A to 9E are diagrams illustrating the outlines of the review displays of a captured image. In the present embodiment, in post-capture review displays, the overall captured image and images obtained by enlarging partial areas of the captured image (enlarged images) are displayed on the monitor 51 in various arrangements. In FIGS. 9A to 9E, to facilitate understanding, the display size of the monitor 51 is set to 320×240 pixels.

Figure 9C:
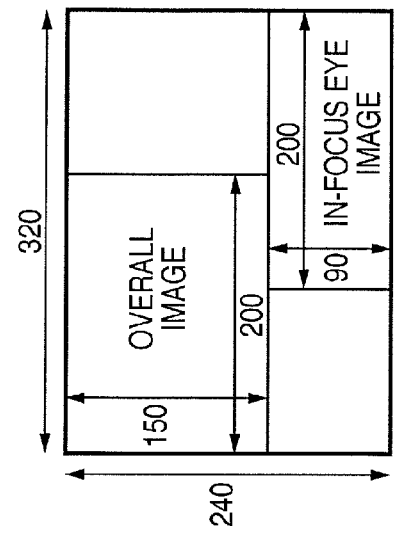
FIGS. 9A to 9E are diagrams illustrating the outlines of the review displays of captured images.
Figure 9B:
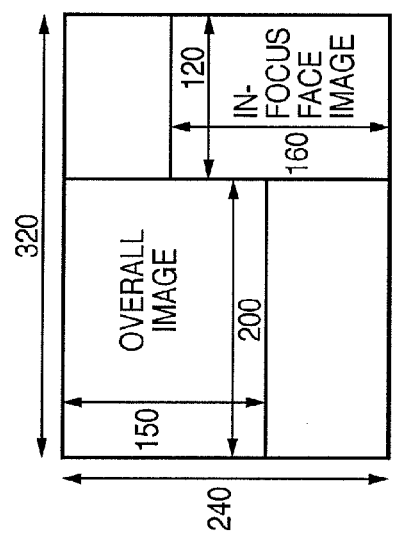
Figure 9E:
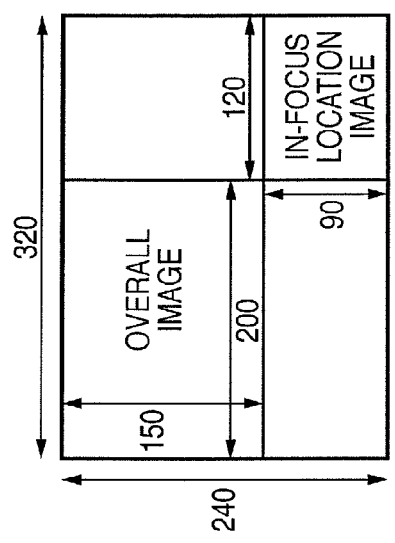
Figure 9A:
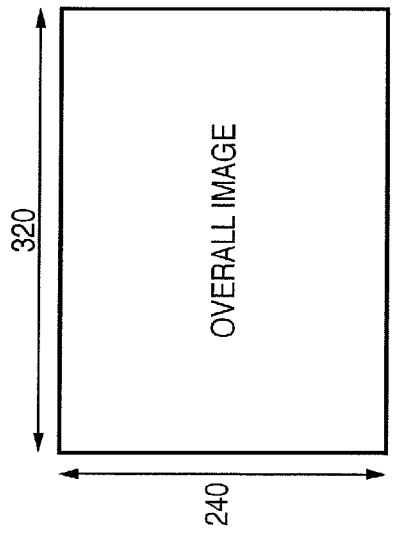

FIG. 9A illustrates a review type, hereinafter referred to as "Type A", displaying an overall image illustrating the entire captured image on the entire monitor 51.

FIG. 9B illustrates a review type, hereinafter referred to as "Type B", simultaneously displaying, on the monitor 51, an overall image and an enlarged image of a face, hereinafter referred to as "face image", in an in-focus area in the case in which the in-focus area is face-based. Here, as an example, the overall image is 200×150 and the face image is 120×160 in size, with the images arranged in diagonal relation.

FIG. 9C illustrates a review type, hereinafter referred to as "Type C", simultaneously displaying, on the monitor 51, an overall image and an enlarged image of the eyes within a face, hereinafter referred to as "eye image", in an in-focus area in the case in which the in-focus area is face-based. Here, as an example, the overall image is 200×150 and the eye image is 200×90 in size, with the images arranged in diagonal relation.

Figure 9D:
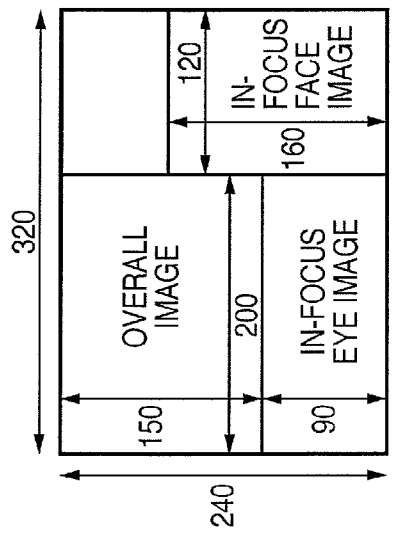

FIG. 9D illustrates a review type, hereinafter referred to as "Type D", simultaneously displaying, on the monitor 51, an overall image along with a face image and an eye image in the case in which the in-focus area is face-based. Here, as an example, the overall image is 200×150, the face image is 120×160, and the eye image is 200×90 in size, with the images arranged as illustrated in FIG. 9D.

FIG. 9E illustrates a review type, hereinafter referred to as "Type E", simultaneously displaying, on the monitor 51, an overall image and an image of an in-focus area, hereinafter referred to as "in-focus location image", in the case in which the in-focus area is not face-based. Here, as an example, the overall image is 200×150 and the in-focus location image is 120×90 in size, with the images arranged in diagonal relation.

The default review display type is Type A, and, in the case in which the in-focus area is face-based, the type is switched from Type A→Type B→Type C→Type D→Type A ... whenever the user presses the DISP switch 24. If the in-focus area is not face-based, the type is switched as follows: Type A→Type E→Type A ....

The above-described review types and arrangements are merely an example and additional review types may exist. For instance, there may be a review type in which the overall image is not displayed. Moreover, the review types used when the in-focus areas are face-based and when the in-focus areas are not face-based may be stored in the flash memory 25 independently of each other, and the user may vary the default types for the respective cases.

<Review Display Data Generation Processing>

Figure 10:
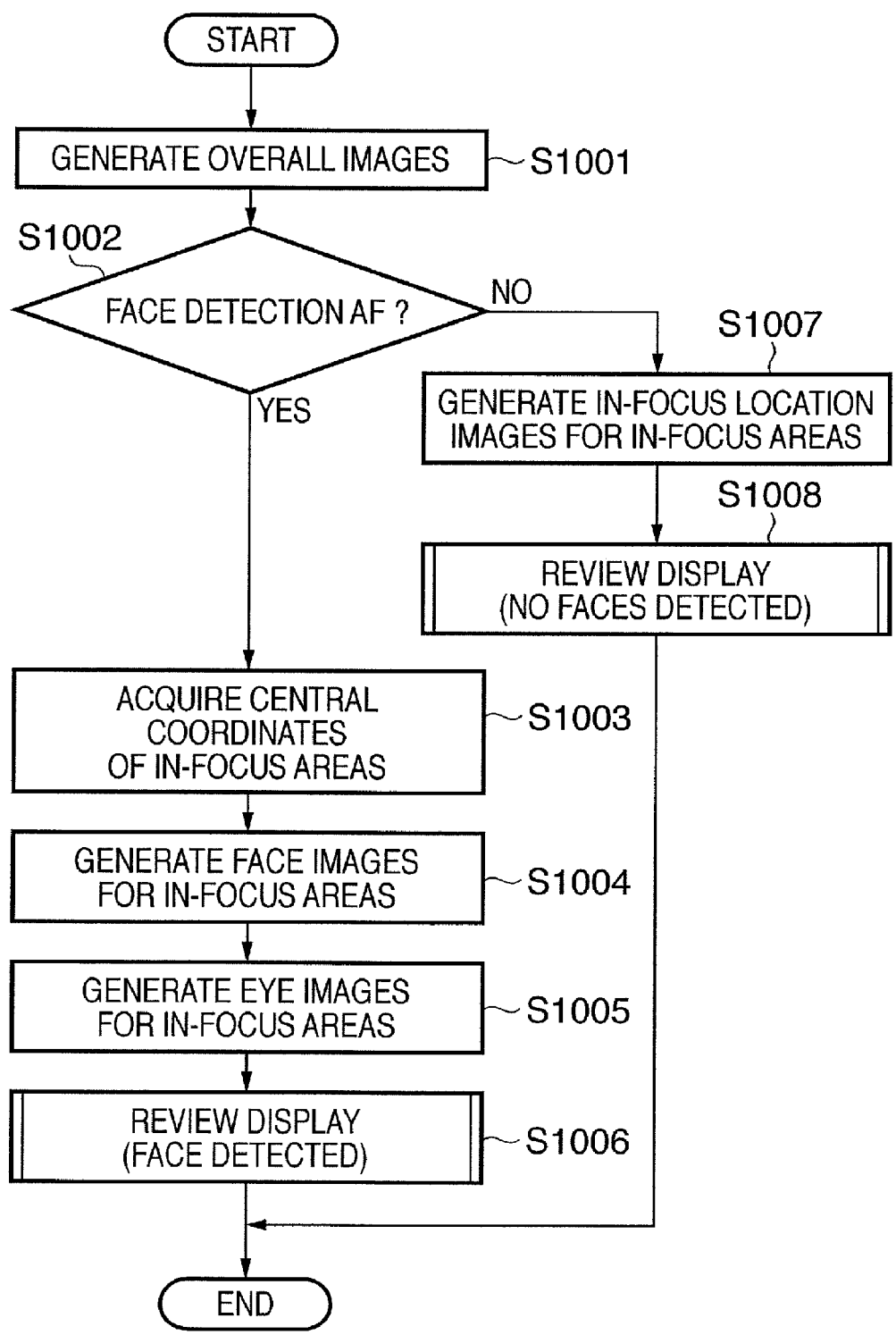
FIG. 10 is a flow chart illustrating the flow of processing used for generating review display data and displaying it on the monitor of the digital camera.

FIG. 10 is a flow chart illustrating the flow of processing used for generating review display data and displaying it on the monitor 51. The flow chart of FIG. 10 is a subroutine used in Step S513 of FIG. 5, which is executed after recording a captured image. However, it may also be executed when the user sets the operating mode of the digital camera 100 to the playback mode and images stored on the storage medium 32 are displayed, etc.

In Step S1001, the digital camera 100 resizes the captured image and generates overall images of two different sizes as explained with reference to FIGS. 9A to 9E.

In Step S1002, the digital camera 100 determines whether the in-focus areas of the captured image are face-based. This determination is carried out, for instance, based on the face detection information included in the header of the JPEG image data in Step S512 of FIG. 5. Namely, if the face detection information contains information concerning the detected faces, it is determined that the in-focus areas are face-based, and if the face detection information indicates that no faces have been detected, it is determined that the in-focus areas are not face-based. If the in-focus areas are face-based, control proceeds to Step S1003, and if not, to Step S1007.

In Step S1003, the digital camera 100 acquires the coordinates of the center of each in-focus area from the in-focus information included in the header of the JPEG image data. The in-focus areas (i.e., focus detection areas) are configured as illustrated by the dotted line in FIG. 6B, with the coordinates of the center being approximately between the eyes. Here, the "in-focus information", as described above, includes the coordinates, sizes and evaluation scores of the respective focus detection areas obtained as in-focus areas in Steps S503 or S504 of FIG. 5.

In Step S1004, the digital camera 100 uses the face detection information contained in the header of the JPEG image data to generate face images for each in-focus area, sized as illustrated in FIGS. 9B and 9D. Specifically, images contained in rectangular areas whose centers have the central coordinates acquired in Step S1003 are extracted from the captured image in such a manner that the size of the faces stored in Step S506 of FIG. 5 is approximately 120% in the horizontal direction and the W:H aspect ratio is 3:4. The extracted images are then modified in size to match the sizes illustrated in FIGS. 9B and 9D. This produces display images occupying areas such that the face images have an appropriate ratio relative to the displayed captured image.

In Step S1005, the digital camera 100 uses the face detection information to generate eye images for each in-focus area, sized as illustrated in FIGS. 9C and 9D. Specifically, images contained in rectangular areas whose centers have the central coordinates acquired in Step S1003 are extracted from the captured image in such a manner that the size of the eyes stored in Step S506 of FIG. 5 is increased approximately 5/3 times in the horizontal direction and the W:H aspect ratio is 20:9. The extracted images are then changed in size to match the size illustrated in FIGS. 9C and 9D. This produces display images occupying areas such that the eye images have an appropriate ratio relative to the displayed captured image.

In Step S1006 the digital camera 100 provides review displays using the generated overall images, face images, and eye images, as will be described below with reference to FIG. 11 through FIG. 15.

In Step S1007, the digital camera 100 uses the in-focus information to generate in-focus location images for each in-focus area, sized as illustrated in FIG. 9E. Specifically, the images of the in-focus areas are extracted from the captured image and changed in size to match the size illustrated in FIG. 9E. This produces display images occupying areas such that the in-focus location images have an appropriate ratio relative to the displayed captured image.

In Step S1008, the digital camera 100 provides a review display using the generated overall image and in-focus location images, as will be described below with reference to FIG. 16 through FIG. 19).

The images produced in each of the above-described steps above are stored, e.g., in the memory unit 26. Moreover, the size of the enlarged images is not limited to the sizes illustrated in FIGS. 9B to 9E. For instance, the generated enlarged images may have the size stored in Step S1502 of FIG. 15 as described below.

In the present embodiment, the digital camera 100 generated all of the review display data at once, but it is also possible to generate the necessary review display data at other tines, such as whenever the review type is switched.

<Outline of Review Display (Face Detected)>

Figure 6A:
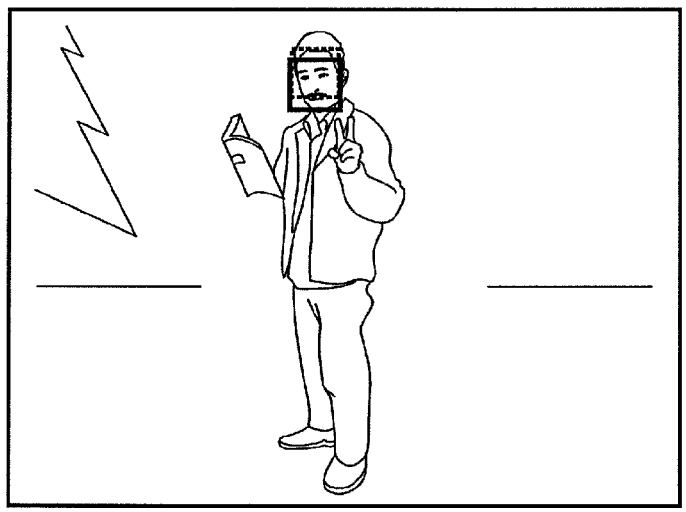
FIGS. 6A to 6C are diagrams illustrating the relationship between the focus detection areas and in-focus areas in Steps S503 through S507 of FIG. 5.
Figure 6B:
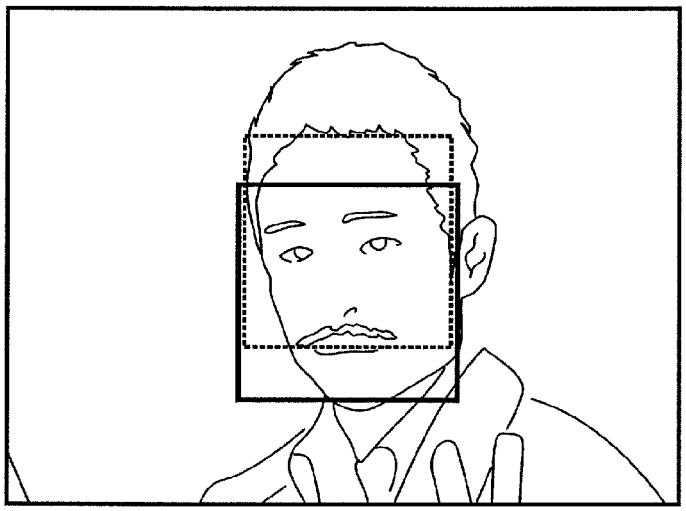
Figure 6C:
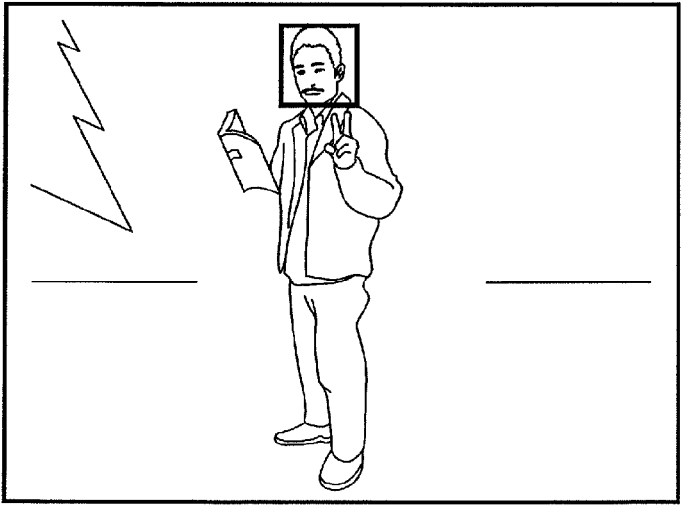
Figure 11:
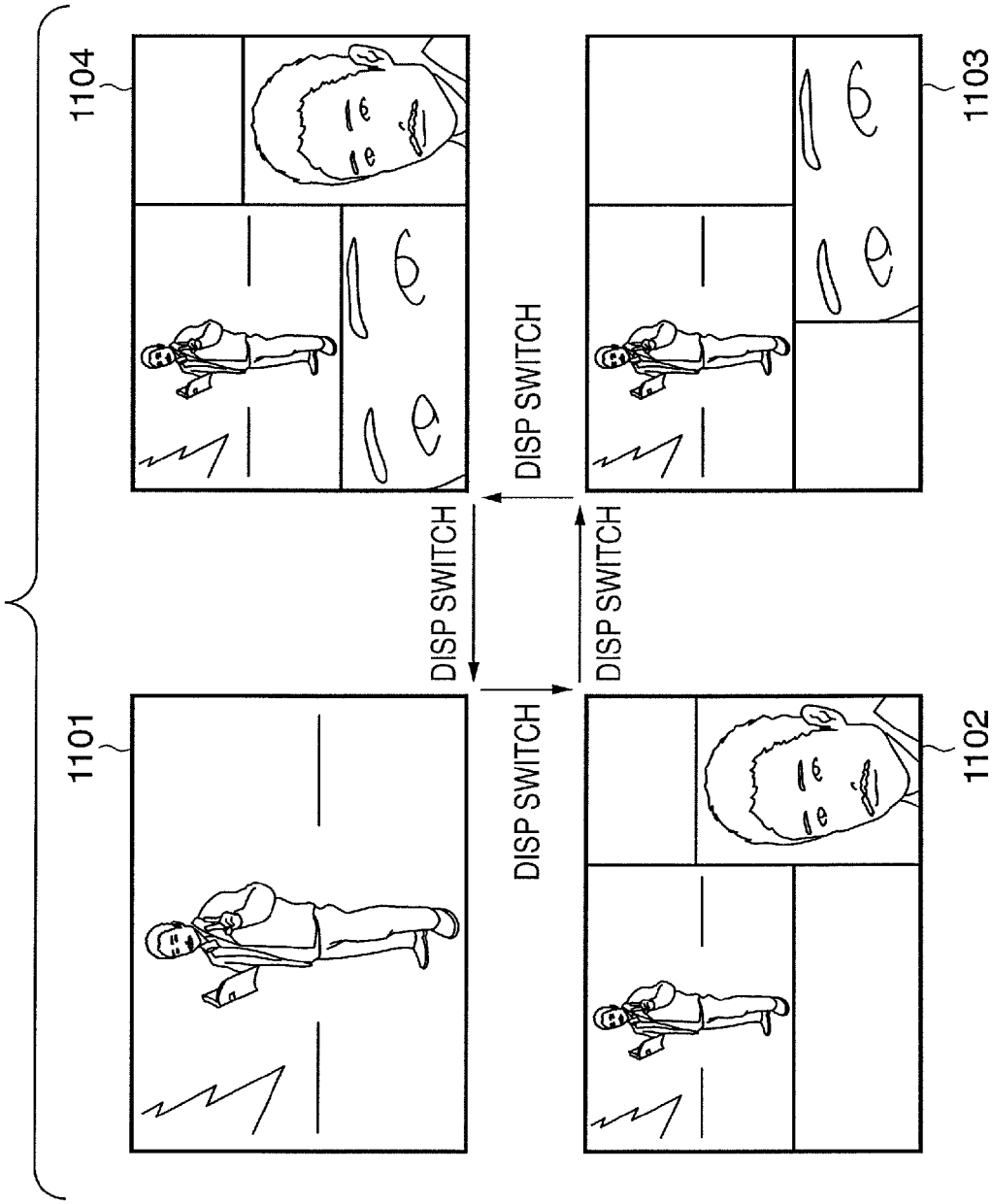
FIG. 11 is a diagram illustrating the outlines of the review displays in Step S1006 of FIG. 10 when the captured image is the one illustrated in FIGS. 6A to 6C.

FIG. 11 is a diagram illustrating the outlines of the review displays in Step S1006 of FIG. 10 when the captured image is the one illustrated in FIGS. 6A to 6C.

In the review displays 1101 through 1104, which correspond to Types A through D described above with reference to FIGS. 9A to 9D, the first type to be displayed is the default type. Then, whenever the DISP switch 24 is depressed, the display is switched as follows: Review Display 1101→Review Display 1102→Review Display 1103→Review Display 1104→Review Display 1101 . . . . Because there is only one in-focus area in FIG. 11, in-focus area switching does not take place when the menu switch 81 is depressed.

Figure 12:
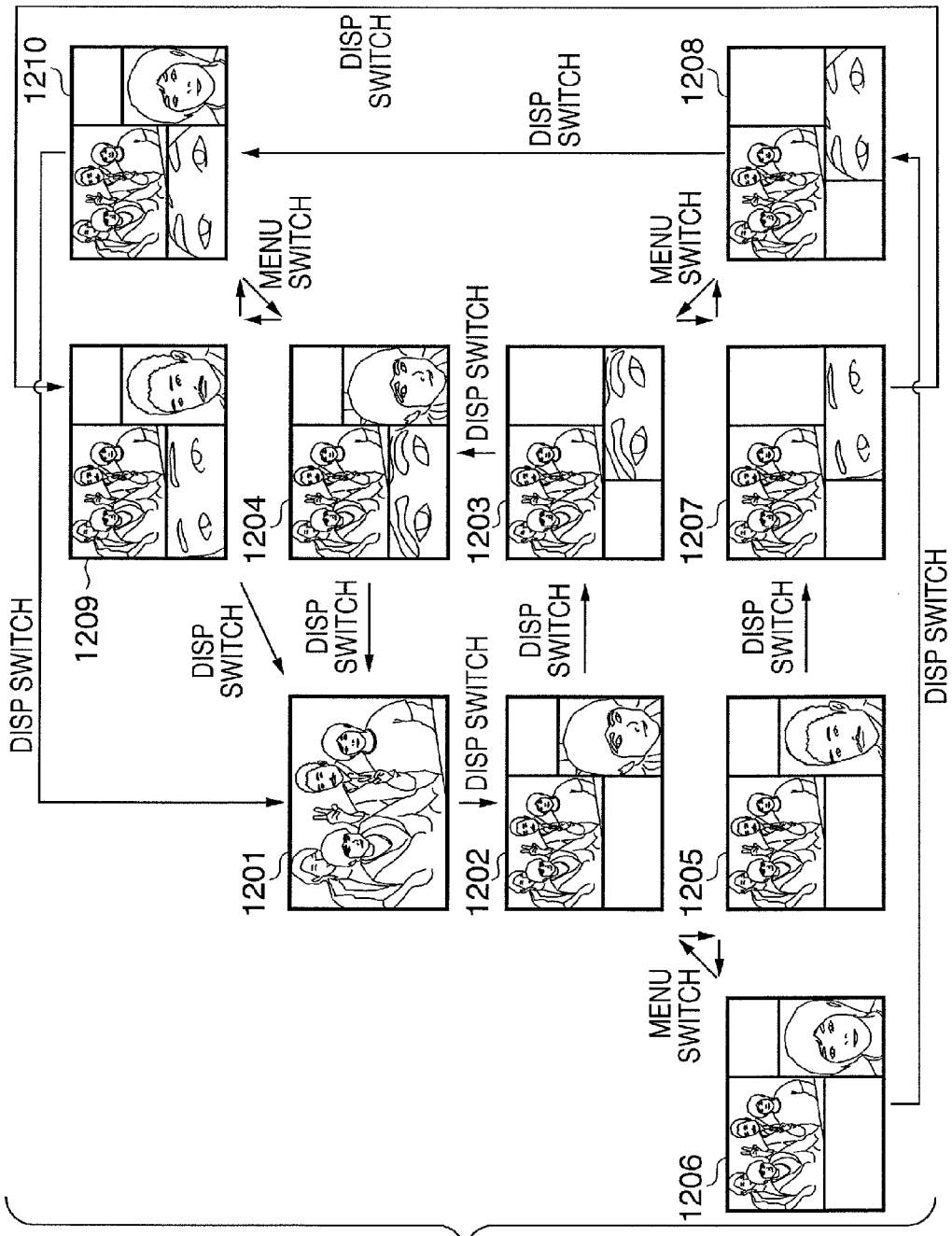
FIG. 12 is a diagram illustrating the outlines of the review displays in Step S1006 of FIG. 10 when the captured image is the one illustrated in FIGS. 7A and 7B.

FIG. 12 is a diagram illustrating the outlines of the review displays in Step S1006 of FIG. 10 when the captured image is the one illustrated in FIGS. 7A and 7B.

In the review displays 1201 through 1210, which correspond to Types A through D described above with reference to FIGS. 9A to 9D, the first type to be displayed is the default type. For instance, if the default type is Type A, the first review display to be displayed is Review Display 1201. Then, whenever the DISP switch 24 is depressed, the display is switched as follows: Review Display 1201→Review Display 1202→Review Display 1203→Review Display 1204→Review Display 1201 . . . . In addition, since there are three in-focus areas in FIG. 12, in-focus area switching occurs when the menu switch 81 is depressed. For instance, if the review type is Type B (Review Display 1202), whenever the menu switch 81 is depressed, displays are switched in accordance with the evaluation scores of the in-focus areas in the order of Review Display 1202→Review Display 1205→Review Display 1206→Review Display 1202 . . . . The evaluation scores of the in-focus areas are the ones stored in Step S506 of FIG. 5. The same is true for the other review types.

<Switching of Review Displays (Face Detected)>

Figure 13:
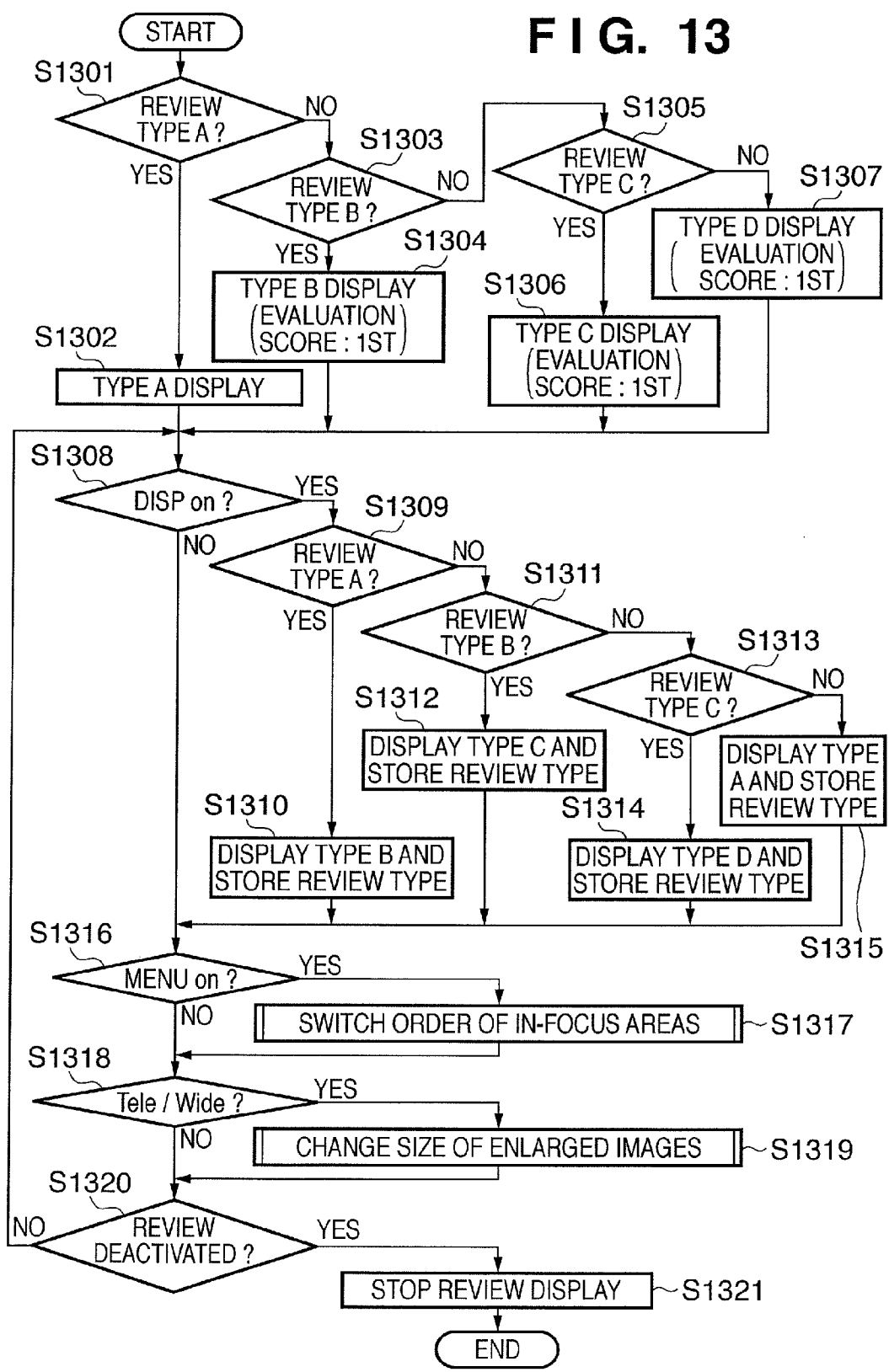
FIG. 13 is a flow chart illustrating the flow of processing used for switching review display types and in-focus areas when the in-focus areas are face-based.

FIG. 13 is a flow chart illustrating the flow of processing used for switching review display types and in-focus areas when the in-focus areas are face-based.

By performing the processing of Steps S1301 through S1307, the digital camera 100 provides a review display corresponding to the review type acquired from the flash memory 25. The face image and eye image displayed this time are related to the in-focus area with the highest evaluation score.

By performing the processing of Steps S1308 through S1315, the digital camera 100 switches the review types when the DISP switch 24 is depressed. The review type obtained after switching is then stored in the flash memory 25.

By performing the processing of Steps S1316 and S1317, the digital camera 100 successively switches the in-focus areas associated with the displayed face image and eye image, starting from the highest evaluation score, when the menu switch 81 is depressed, as described below with reference to FIG. 14).

By performing the processing of Steps S1318 and S1319, the digital camera 100 modifies the size of the displayed face image and eye image and modifies the size of the overall image when the T/W switch 21 is depressed, as described below with reference to FIG. 15).

In Step S1320, the digital camera 100 determines whether the review display has been deactivated. The review display is deactivated depending on predetermined conditions, such as passage of a predetermined period of time or the underpressing of the release switch 23, etc. If the review display has not been deactivated, control returns to Step S1308 and the same processing is repeated. If the review display has been deactivated, in Step S1321 the digital camera 100 stops the review display and terminates processing.

Figure 14:
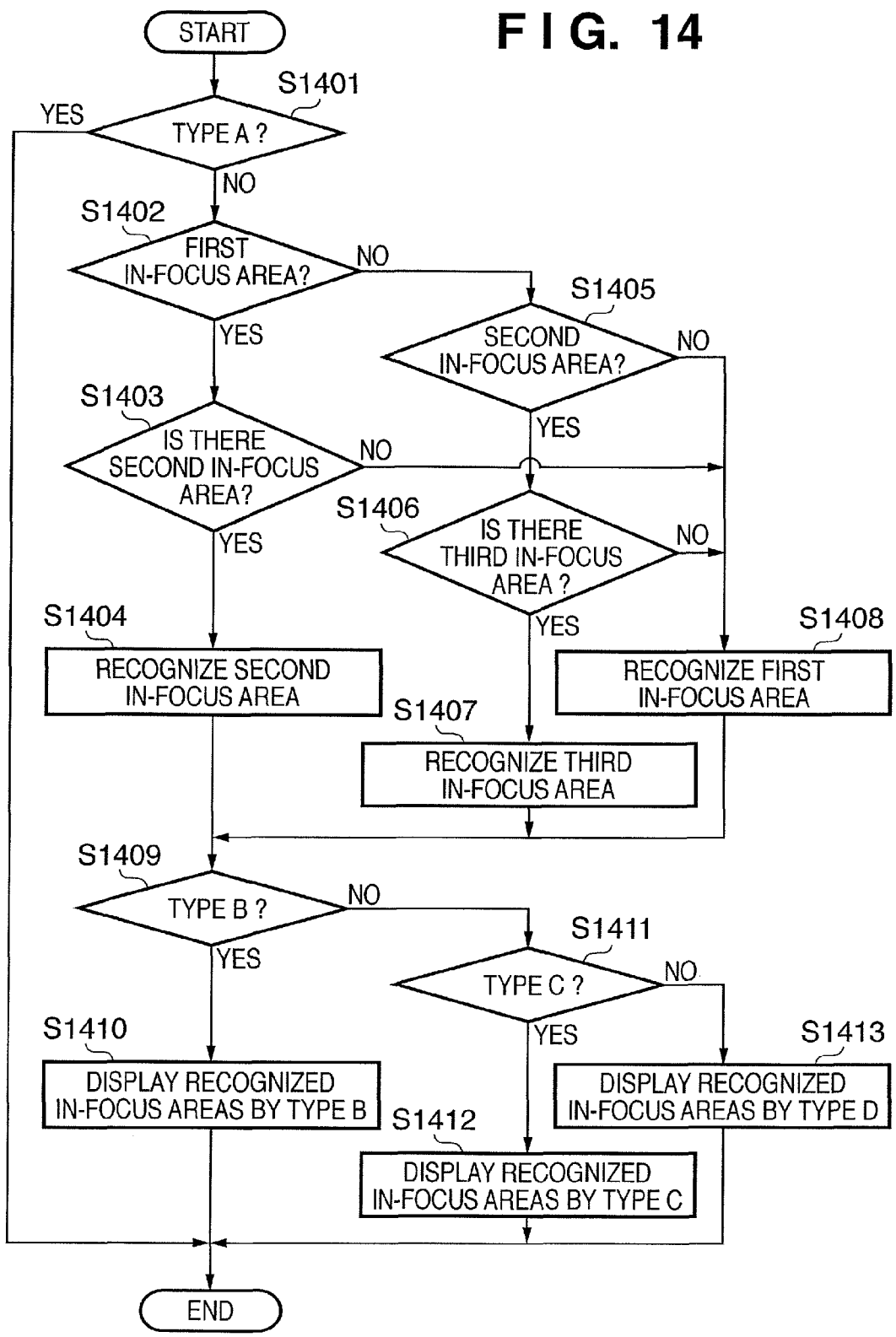
FIG. 14 is a flow chart illustrating the detailed flow of processing in Step S1317 of FIG. 13.

FIG. 14 is a flow chart illustrating the detailed flow of processing in Step S1317 of FIG. 13.

As illustrated in Step S1401, if the review display is Type A, no face images or eye images are displayed and thus processing is terminated.

By performing the processing of Steps S1402 through S1408, the digital camera 100 switches the in-focus areas associated with the face image and eye image in the order of the evaluation scores.

By performing the processing of Steps S1409 through S1413, the digital camera 100 uses the face image and eye image associated with in-focus area obtained by switching and provides a review display of the set type.

Figure 15:
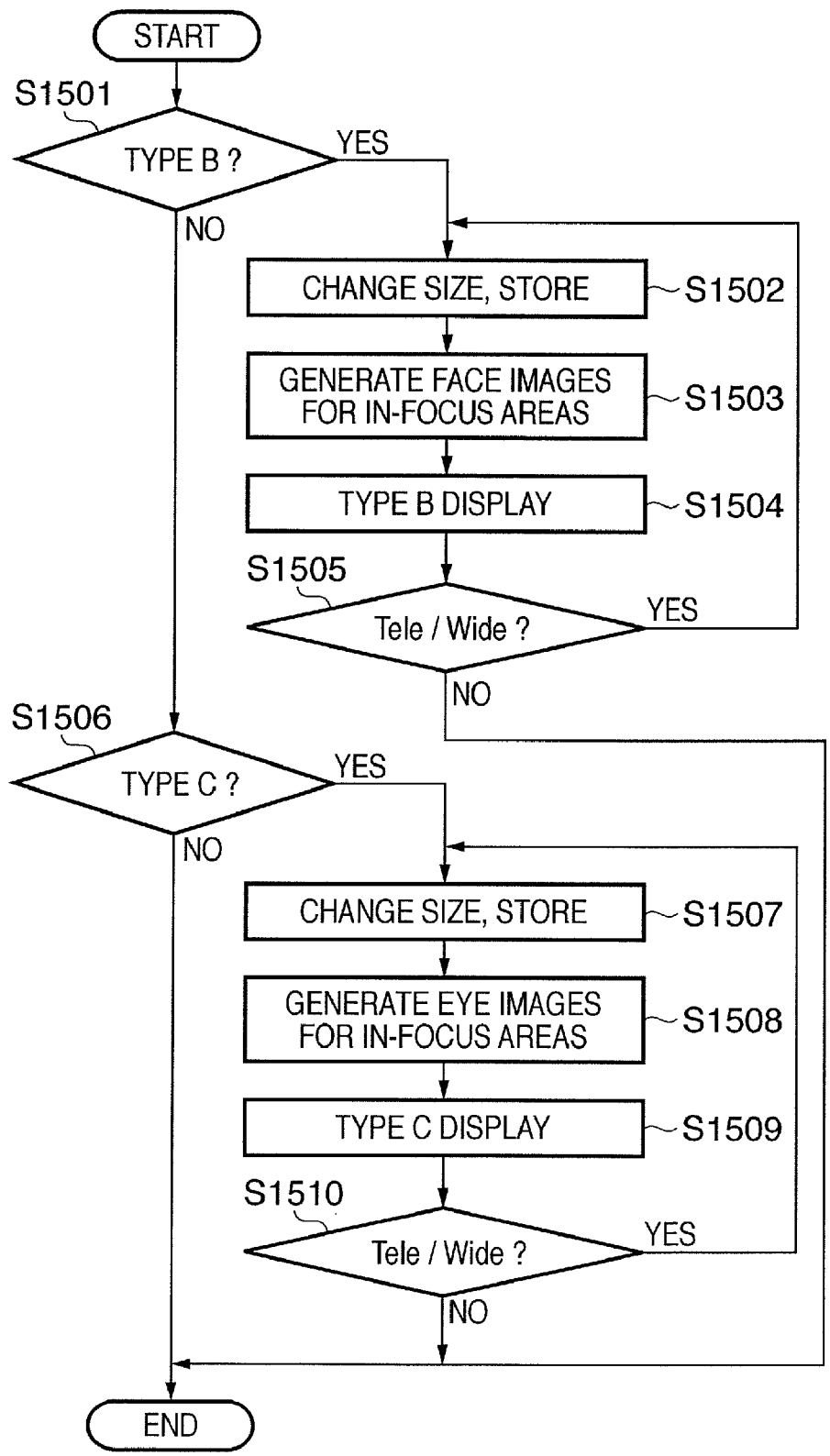
FIG. 15 is a flow chart illustrating the detailed flow of processing in Step S1319 of FIG. 13.

FIG. 15 is a flow chart illustrating the detailed flow of processing in Step S1319 of FIG. 13.

As can be appreciated from Steps S1501 and S1506, in the case of Type A or Type D, there is no change in the size of the enlarged images and the process terminates. This is due to the fact that no enlarged image is displayed in the case of Type A and displaying images of a different size is difficult in the case of Type D. In the case of Type D, the size may be changed using certain methods.

By performing the processing of Steps S1502 through S1505, the digital camera 100 progressively increases or decreases the size of the area extracted as a face image from the captured image while the T/W switch 21 is depressed. For example, while the size of the area extracted in Step S1004 was such that "the size of the faces was increased approximately up to 120% in the horizontal direction", in this case the size of the extracted area may be 125% or 115%. The size obtained after the change is stored in the flash memory 25. The area is displayed on the next captured image based on the information stored in the flash memory 25 for cases with face detection. Specifically, for instance, if an area constituting 150% of the face area is configured by modifying the size of the face image, when the next captured image is displayed, an area constituting 150% of the face area is displayed even though the range of the face area relative to the overall image changes. As a result, the user can display the desired face area without performing the operations again for the next captured image.

In addition, the digital camera 100 may increase or decrease the size of the face area displayed on the monitor 51. In other words, in FIG. 9B, the size of the displayed face image was 120×160, but it is possible to increase it to 150× 200, etc. At such time, as the size of the displayed face image is modified, the displayable size of the overall image changes as well, and, as a result, a corresponding overall image is generated.

The processing of Steps S1507 through S1510 is identical to that of Steps S1502 through S1505, except that the processing is carried out on an eye image instead of a face image.

<Outline of Review Display (No Face Detected)>

Figure 16:
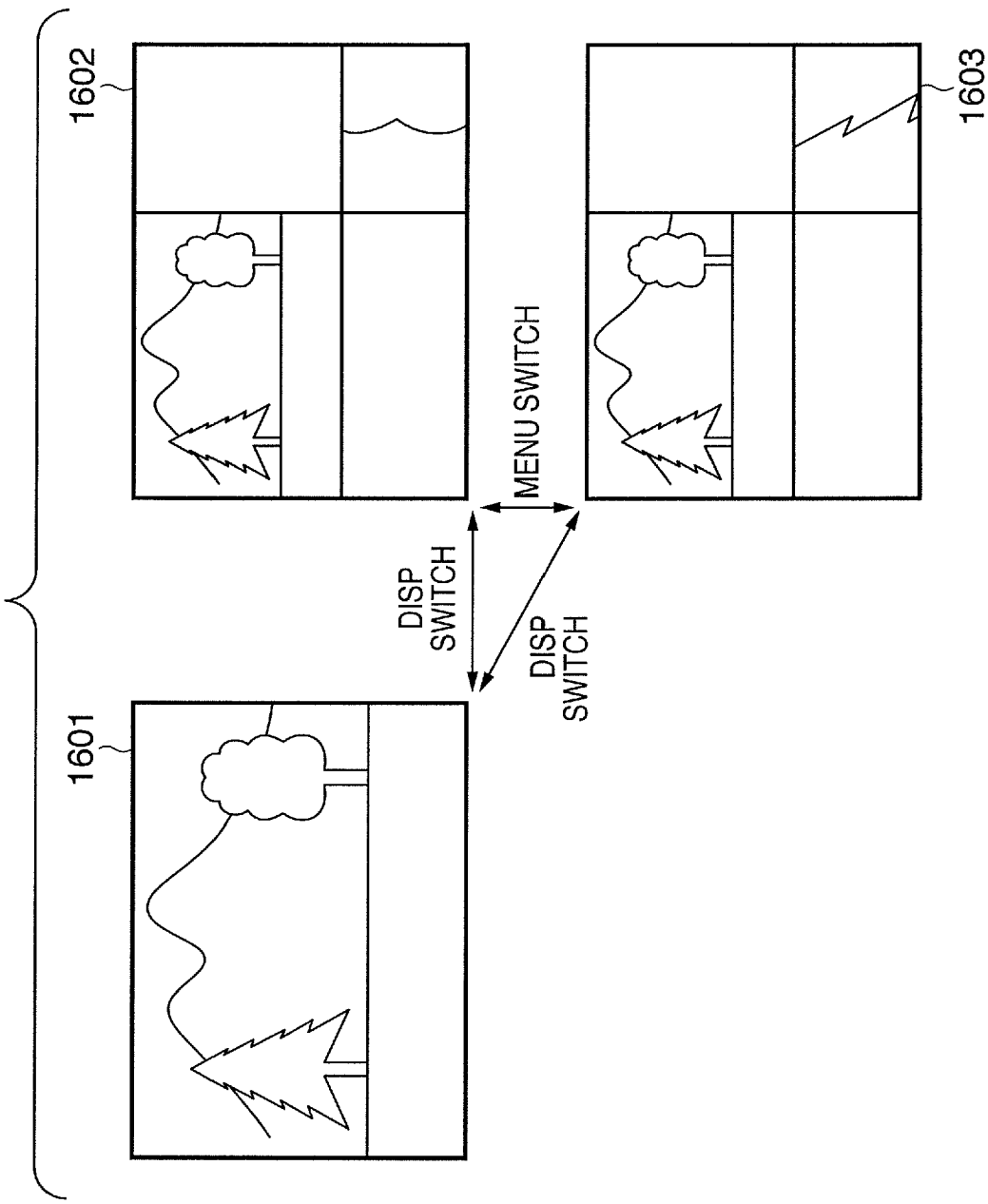
FIG. 16 is a diagram illustrating the outlines of the review displays in Step S1008 of FIG. 10 when the captured image is the one illustrated in FIGS. 8A and 8B.

FIG. 16 is a diagram illustrating the outlines of the review displays in Step S1008 of FIG. 10 when the captured image is the one illustrated in FIGS. 8A and 8B.

The review display 1601 corresponds to Type A explained with reference to FIG. 9A while the review displays 1602 and 1603 correspond to Type E explained with reference to FIG. 9E. The type to be displayed first is the default type. When a Type E review display is used, an in-focus location image related to the in-focus area with the highest evaluation score is displayed along with the overall image. Whenever the DISP switch 24 is depressed, the type of the review display is switched, and whenever the menu switch 81 is depressed, the in-focus location image is switched in accordance with the evaluation score of the in-focus area.

<Switching of Review Display (No Face Detected)>

Figure 17:
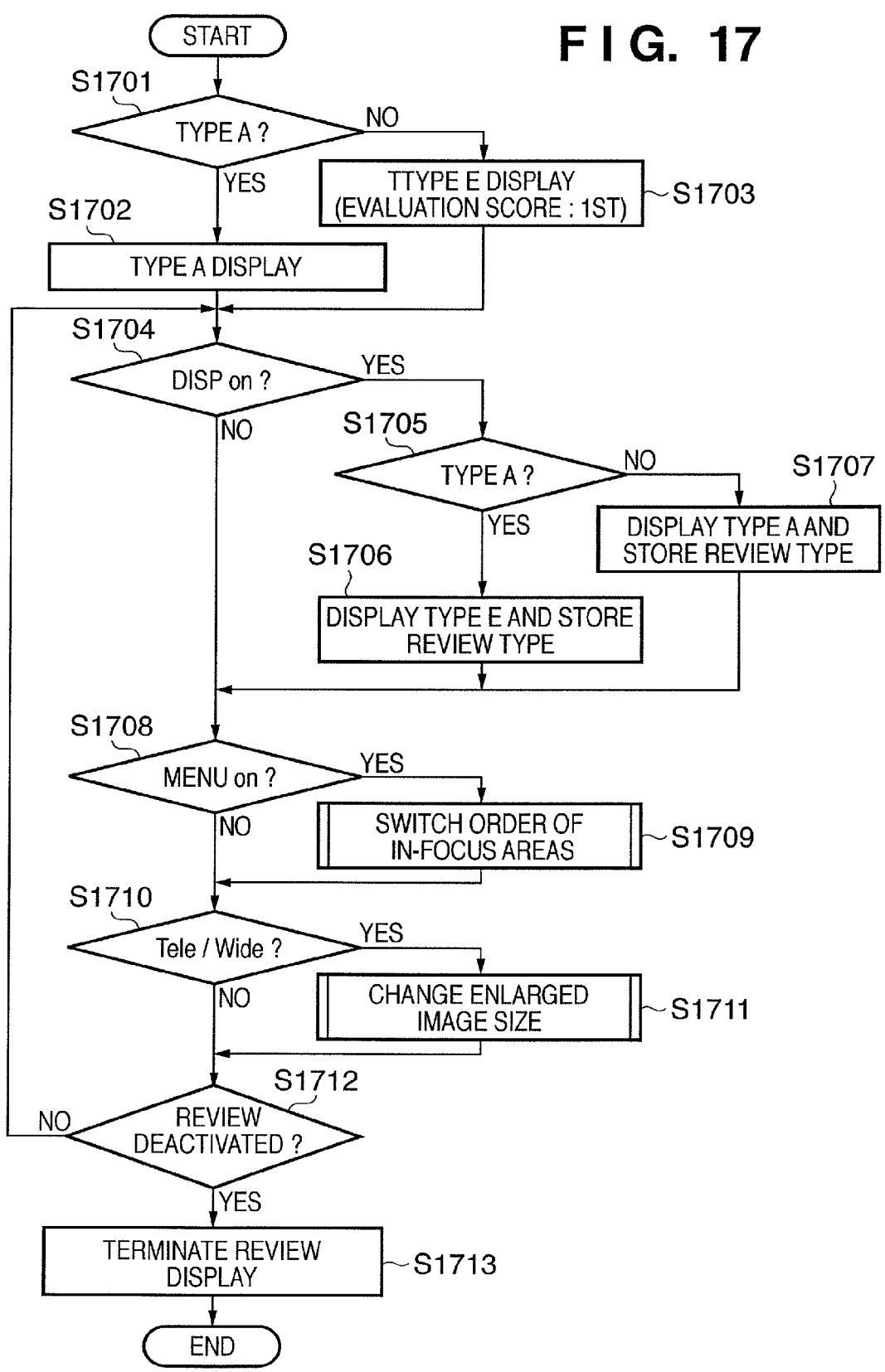
FIG. 17 is a flow chart illustrating the flow of processing used for switching review display types and in-focus areas when the in-focus areas are not face-based.

FIG. 17 is a flow chart illustrating the flow of processing used for switching review display types and in-focus areas when the in-focus areas are not face-based.

By performing the processing of Steps S1701 through S1703, the digital camera 100 provides a review display corresponding to the review type acquired from the flash memory 25. The face image and eye image displayed at that time are related to the in-focus area with the highest evaluation score.

By performing the processing of Steps S1704 through S1707, the digital camera 100 switches the review types when the DISP switch 24 is depressed. The review type obtained after switching is then stored in the flash memory 25.

By performing the processing of Steps S1708 and S1709, the digital camera 100 successively switches the in-focus areas associated with the displayed in-focus location images, starting from the highest evaluation score, when the menu switch 81 is depressed, as described below with reference to FIG. 18.

By performing the processing of Steps S1710 and S1711, the digital camera 100 modifies the size of the displayed in-focus location image and simultaneously modifies the size of the overall image when the T/W switch 21 is depressed, as described below with reference to FIG. 19.

In Step S1712, the digital camera 100 determines whether the review display has been deactivated. The review display is deactivated depending on predetermined conditions, such as passage of a predetermined period of time or the underpressing of the release switch 23, etc. If the review display has not been deactivated, control returns to Step S1704 and the same processing is repeated. If the review display has been deactivated, in Step S1713 the digital camera 100 stops the review display and terminates processing.

Figure 18:
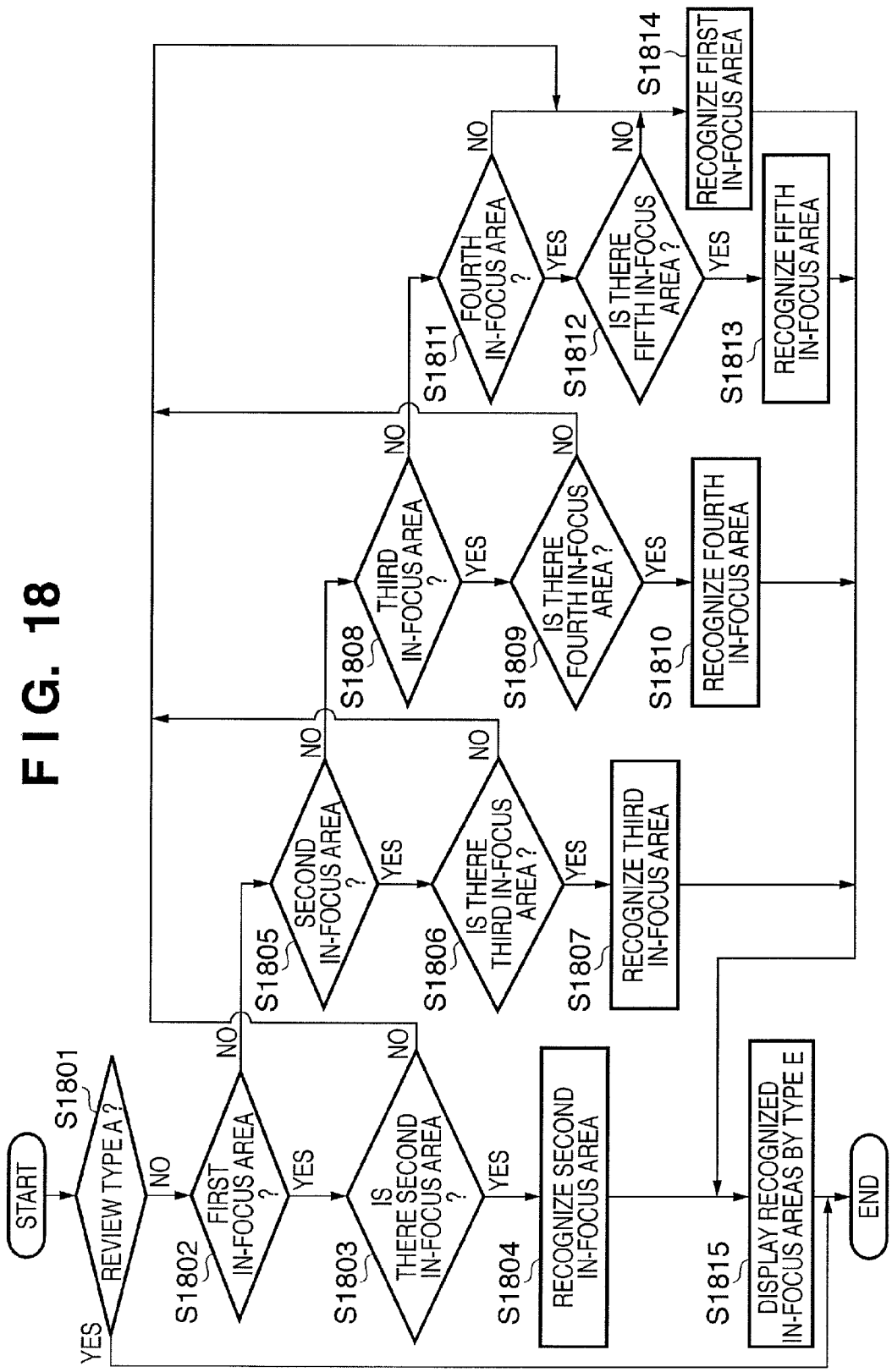
FIG. 18 is a flow chart illustrating the detailed flow of processing in Step S1709 of FIG. 17.

FIG. 18 is a flow chart illustrating the detailed flow of processing in Step S1709 of FIG. 17.

As illustrated in Step S1801, if the review display is Type A, no in-focus location images are displayed and processing is terminated.

By performing the processing of Steps S1802 through S1814, the digital camera 100 switches the in-focus areas associated with the in-focus location images in the order of their evaluation scores.

By performing the processing of Step S1815, the digital camera 100 uses the in-focus location image associated with the in-focus area obtained by switching and provides a review display of the set type. In the present case, Type E.

Figure 19:
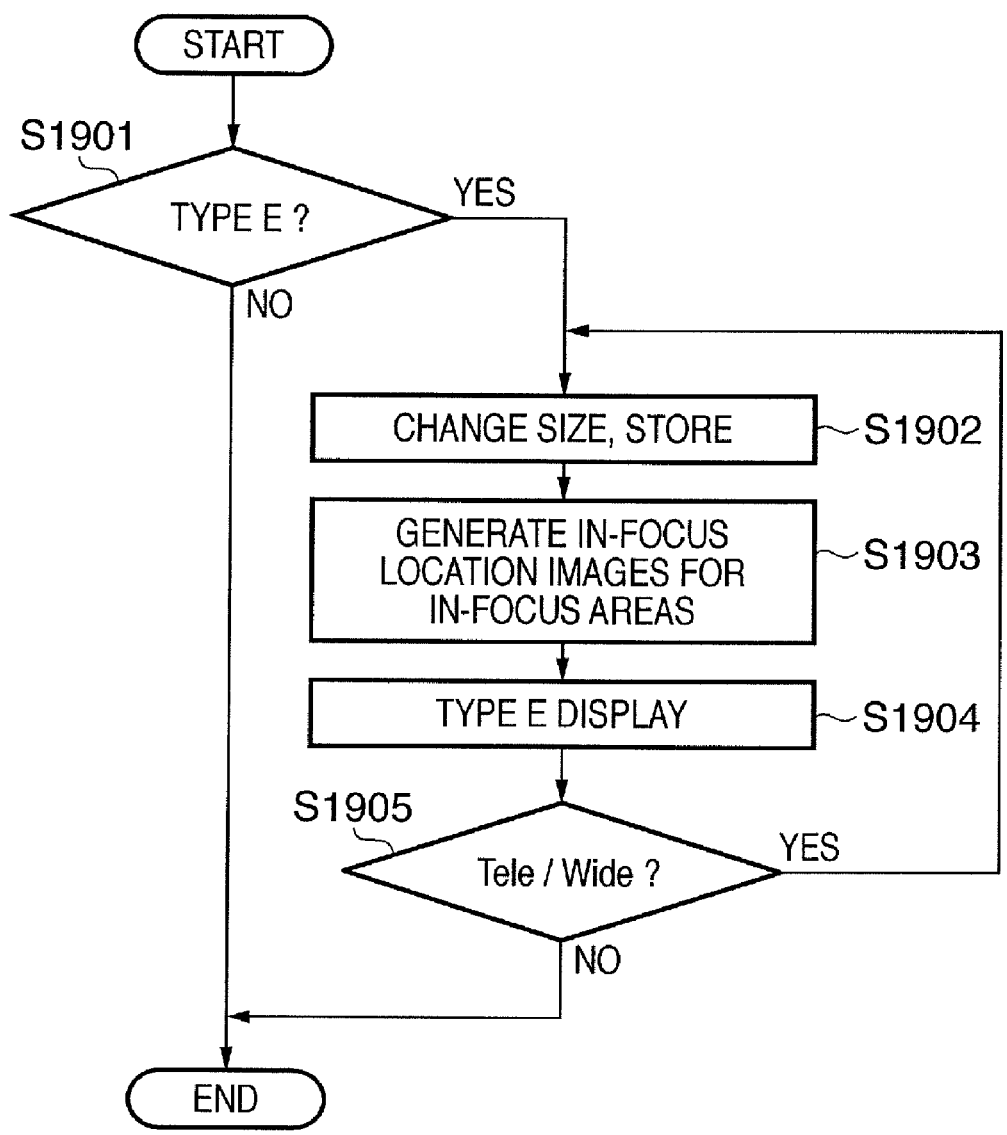
FIG. 19 is a flow chart illustrating the detailed flow of processing in Step S1711 of FIG. 17.

FIG. 19 is a flow chart illustrating the details of processing flow in Step S1711 of FIG. 17.

First, in Step 1901, in the case of any type other than Type E, the process terminates.

By performing the processing of Steps S1902 through S1905, the digital camera 100 progressively increases or decreases the size of the in-focus location image while the T/W switch 21 is depressed. The size obtained after the change is stored in the flash memory 25. The digital camera 100 uses the changed size to generate an in-focus location image for each in-focus area. In addition, as the size of the in-focus location image is modified, the displayable size of the overall image changes as well, and, as a result, a corresponding overall image is also generated.

In the above-described processes, the size of the in-focus location image in Step S1902, the size of the face image in Step S1502, and the size of the eye image in Step S1507 of FIG. 15 are independently stored in the flash memory 25. However, the size of the in-focus location image may be expressed as a deviation from the default size and a single deviation ratio may be shared. As a result, the area is displayed on the next captured image based on the information stored in the flash memory 25 for cases without face detection. Specifically, for instance, if an area constituting 150% of the in-focus location area is configured by modifying the size of the in-focus location image, when the next captured image is displayed, an area constituting 150% of the in-focus location area is displayed even though the range of the in-focus location area relative to the overall image changes. As a result, the user can display the desired in-focus location area without performing the operations again for the next captured image.

As described above, in the present embodiment, when displaying enlarged images associated with in-focus areas in the captured image, the digital camera 100 displays the enlarged images in various formats depending on whether the in-focus areas are associated with faces or not.

As a result, it becomes possible to display, on the image display apparatus, enlarged images suitable for verifying the focus state of captured images regardless of whether the in-focus areas are selected from focus detection areas set up in association with faces or not. This makes it easier for the user to verify the focus state.

The above-described processing may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions described above are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-249958, filed on Sep. 14, 2006, which is hereby incorporated by reference herein in its entirety.

What is claimed is:

1. An image display apparatus comprising:
   an obtaining unit configured to obtain a captured image containing face detection information, which is information related to a face of an object detected during image capture, and information related to a focus detection area utilized during the image capture;
   an extraction unit configured to extract an area, which is different from the focus detection area, based on the information related to the focus detection area and the face detection information from the captured image when the focus detection area is determined based on a detected object's face, and to extract an area, which is same as the focus detection area, based on the information related to the focus detection area from a captured image when the focus detection area is not determined based on a detected object's face; and
   a display unit configured to enlarge and display an image of a partial area of the captured image on a display device, wherein (i) the display unit enlarges and displays an image of the partial area corresponding to the extracted area, which is different from the focus detection area, on the display device when the focus detection area is determined based on the detected object's face, and (ii) the display unit enlarges and displays an image of the partial area corresponding to the extracted area, which is same as the focus detection area, on the display device when the focus detection area is not determined based on the detected object's face.

2. The image display apparatus according to claim 1, wherein the display unit displays the captured image on the display device in addition to the partial area of the captured image.

3. The image display apparatus according to claim 1, further comprising a switching unit configured to, in accordance with a user instruction, switch a state of the display unit between displaying the captured image on the display device without displaying the partial area of the captured image and displaying the captured image and the partial area of the captured image on the display device.

4. The image display apparatus according to claim 1, wherein the display unit displays a vertically elongated area including an entire face corresponding to the focus detection area, and a horizontally elongated area including eyes of the face corresponding to the focus detection area.

5. The image display apparatus according to claim 1, wherein the display unit displays the partial area of the captured image on the display device based on a selection instruction of a user.

6. An image capturing apparatus comprising the image display apparatus according to claim 1 and an image capturing unit configured to capture an object image,
   wherein the image display apparatus displays an object image captured by the image capturing unit.

7. The image display apparatus according to claim 1, wherein
   the captured image obtained by the obtaining unit is an image captured upon undergoing focusing control based on an output signal from the focus detection area determined based on the face detection information; and
   the extraction unit extracts, as the area which is different from the focus detection area, a face area from the captured image based on the face detection information when the focus detection area is determined based on the detected object's face,
   the image display apparatus further comprising a change unit configured to change a range of extraction performed by the extraction unit relative to the captured image,
   wherein the change unit stores the range of extraction obtained after a change, and
   wherein when extracting, enlarging, and displaying a face area from a next captured image, the extraction unit extracts the face area from the next captured image in accordance with a stored range of extraction and the display unit displays the face area on the display device.

8. An image display method, the method comprising:
   obtaining a captured image containing face detection information, which is information related to a face of an object detected during image capture, and information related to a focus detection area utilized during the image capture;
   extracting an area, which is different from the focus detection area, based on the information related to the focus detection area and the face detection information from the captured image when the focus detection area is determined based on a detected object's face, and extracting an area, which is same as the focus detection area, based on the information related to the focus detection area from the captured image when the focus detection area is not determined based on a detected object's face; and enlarging and displaying an image of a partial area of the captured image on a display device, wherein (i) an image of the partial area corresponding to the extracted area, which is different from the focus detection area, is displayed on the display device when the focus detection area is determined based on the detected object's face, and (ii) an image of the partial area corresponding to the extracted area, which is same as the focus detection area, is displayed on the display device when the focus detection area is not determined based on the detected object's face.

9. A non-transitory computer-readable storage medium storing computer-executable process steps, the computer-executable process steps causing a computer to execute the method of claim 8.

* * * * *